United States Patent
Miyadera et al.

(10) Patent No.: US 10,012,925 B2
(45) Date of Patent: Jul. 3, 2018

(54) IMAGE FORMING APPARATUS AND IMAGE FORMING METHOD

(71) Applicants: Tatsuya Miyadera, Kanagawa (JP); Muneaki Iwata, Kanagawa (JP); Hayato Fujita, Kanagawa (JP)

(72) Inventors: Tatsuya Miyadera, Kanagawa (JP); Muneaki Iwata, Kanagawa (JP); Hayato Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/600,385

(22) Filed: May 19, 2017

(65) Prior Publication Data

US 2017/0343920 A1 Nov. 30, 2017

(30) Foreign Application Priority Data

May 30, 2016 (JP) .................................. 2016-107648

(51) Int. Cl.
*G06F 15/00* (2006.01)
*G03G 15/043* (2006.01)
*G03G 15/04* (2006.01)
*H04N 1/40* (2006.01)
(Continued)

(52) U.S. Cl.
CPC ..... *G03G 15/043* (2013.01); *G03G 15/04045* (2013.01); *G06K 15/1873* (2013.01); *H04N 1/40056* (2013.01); *G06K 15/12* (2013.01)

(58) Field of Classification Search
CPC .. G03G 15/043; G03G 15/01; G03G 15/0126; G03G 2215/0119; G03G 2215/0164; G03G 13/045; G03G 15/04027; G03G 15/045; G03G 15/5095;
(Continued)

(56) References Cited

U.S. PATENT DOCUMENTS

| 2009/0190940 A1* | 7/2009 | Miyadera ........... G03G 15/0194 399/39 |
| 2010/0232817 A1* | 9/2010 | Miyadera ............ G03G 15/161 399/40 |
| 2011/0026082 A1 | 2/2011 | Miyadera et al. |

(Continued)

FOREIGN PATENT DOCUMENTS

| JP | 11-266367 | 9/1999 |
| JP | 11-266373 | 9/1999 |

(Continued)

*Primary Examiner* — Negussie Worku
(74) *Attorney, Agent, or Firm* — Duft Bornsen & Fettig LLP

(57) ABSTRACT

An image forming apparatus includes a photoconductor, a light source, and circuitry that receives: first image data including first pixels each indicating image density or one of turning on and off the light source; and tag data indicating an attribute of each first pixels. The circuitry sets specific data to identify a first target pixel subjected to change out of the first pixels, converts the first image data into second image data having a higher resolution than that of the first image data, and controls the light source according to the second image data to form an image. In conversion, the circuitry identifies a second target pixel corresponding to the first target pixel out of second pixels of the second image data according to the specific data and the tag data, and changes the second target pixel into a pixel to turn on the light source.

20 Claims, 33 Drawing Sheets

(51) Int. Cl.
*G06K 15/02* (2006.01)
*G06K 15/12* (2006.01)

(58) Field of Classification Search
CPC ... G03G 2215/0059; G03G 2215/2083; H04N 1/00; H04N 1/00822
USPC ......... 358/1.1, 1.15, 1.2, 1.9, 475, 504, 518; 399/49, 130, 297, 320, 39, 45; 347/110, 347/118; 382/162, 167, 284
See application file for complete search history.

(56) References Cited

U.S. PATENT DOCUMENTS

| | | | |
|---|---|---|---|
| 2011/0052232 A1* | 3/2011 | Ohshima | G03G 15/0131 399/49 |
| 2011/0304867 A1 | 12/2011 | Yokoyama et al. | |
| 2012/0099165 A1 | 4/2012 | Omori et al. | |
| 2012/0229866 A1 | 9/2012 | Miyazaki et al. | |
| 2012/0287479 A1 | 11/2012 | Takahashi et al. | |
| 2013/0127980 A1* | 5/2013 | Haddick | G06F 3/013 348/14.08 |
| 2013/0278631 A1* | 10/2013 | Border | G02B 27/017 345/633 |
| 2014/0078521 A1 | 3/2014 | Hayashi et al. | |
| 2014/0146371 A1 | 5/2014 | Hayashi et al. | |
| 2014/0204429 A1 | 7/2014 | Miyadera et al. | |
| 2014/0333941 A1 | 11/2014 | Iwata et al. | |
| 2014/0347708 A1 | 11/2014 | Omori et al. | |
| 2015/0125171 A1 | 5/2015 | Iwata et al. | |
| 2015/0156373 A1 | 6/2015 | Fujita et al. | |
| 2015/0350491 A1 | 12/2015 | Iwata et al. | |
| 2015/0355568 A1* | 12/2015 | Tachibana | G03G 15/045 347/118 |
| 2016/0012322 A1* | 1/2016 | Iwata | G06K 15/1874 358/1.2 |
| 2016/0126977 A1 | 5/2016 | Miyadera et al. | |
| 2016/0247050 A1* | 8/2016 | Fujita | H04N 1/00822 |
| 2016/0364188 A1* | 12/2016 | Miyadera | G06F 3/1234 |
| 2016/0378016 A1* | 12/2016 | Tachibana | G03G 15/043 358/1.1 |
| 2017/0011282 A1* | 1/2017 | Iwasaki | G06K 15/1223 |
| 2017/0220913 A1* | 8/2017 | Miyadera | G06K 15/1842 |

FOREIGN PATENT DOCUMENTS

| | | |
|---|---|---|
| JP | 2004-237531 | 8/2004 |
| JP | 2007-215204 | 8/2007 |
| JP | 2015-177242 | 10/2015 |

\* cited by examiner

FIG. 22A
FIG. 22B
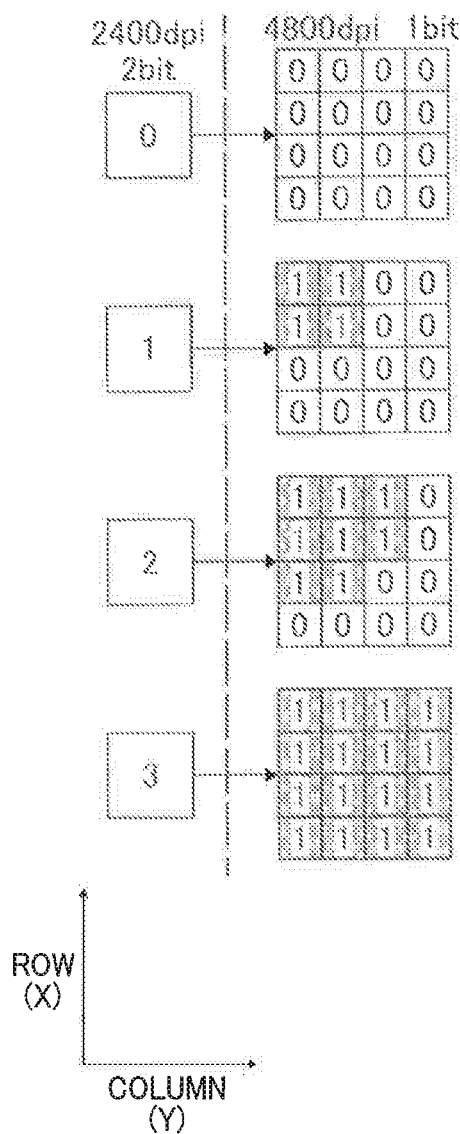
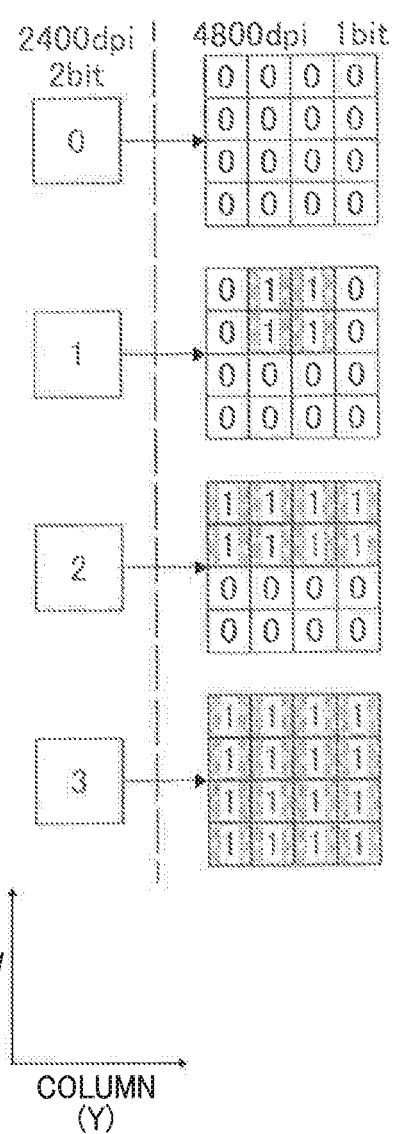

FIG. 24A
FIG. 24B
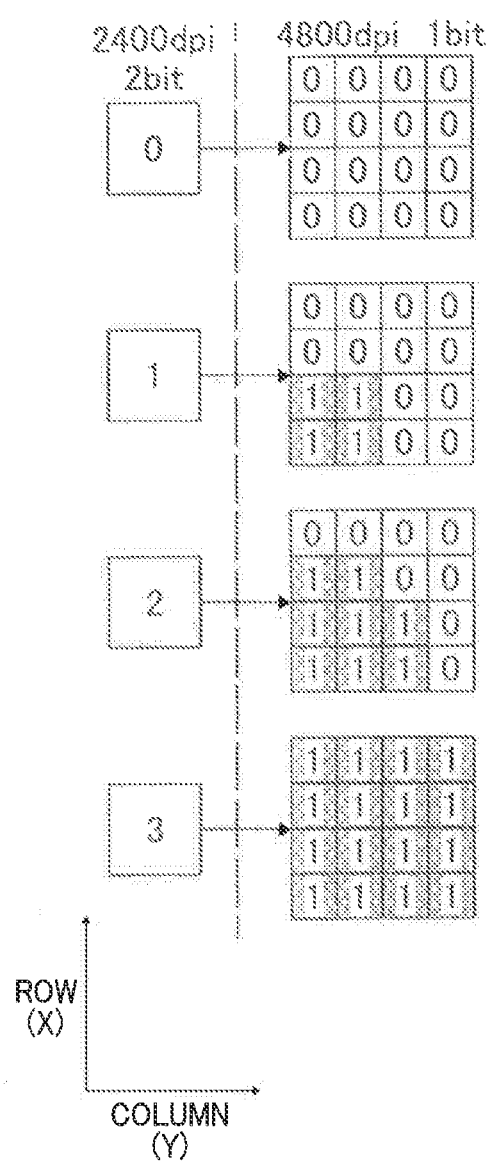
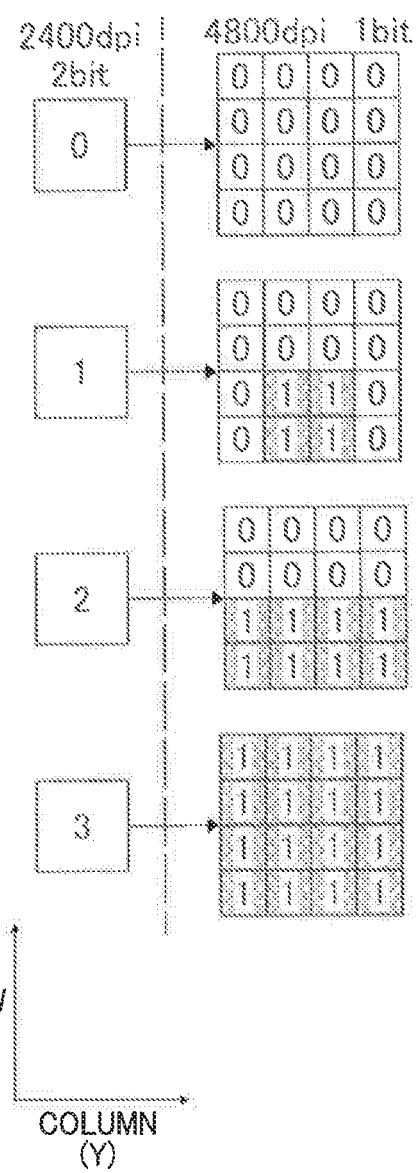

FIG. 25A
FIG. 25B
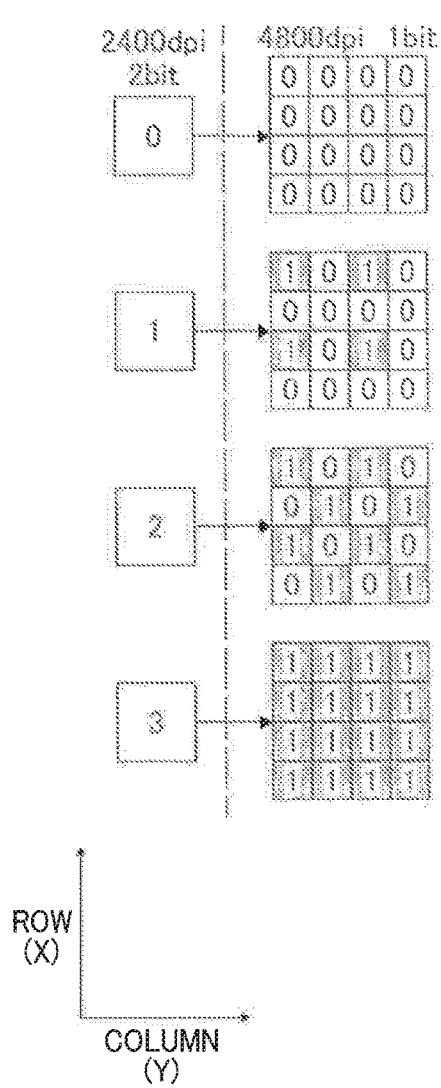
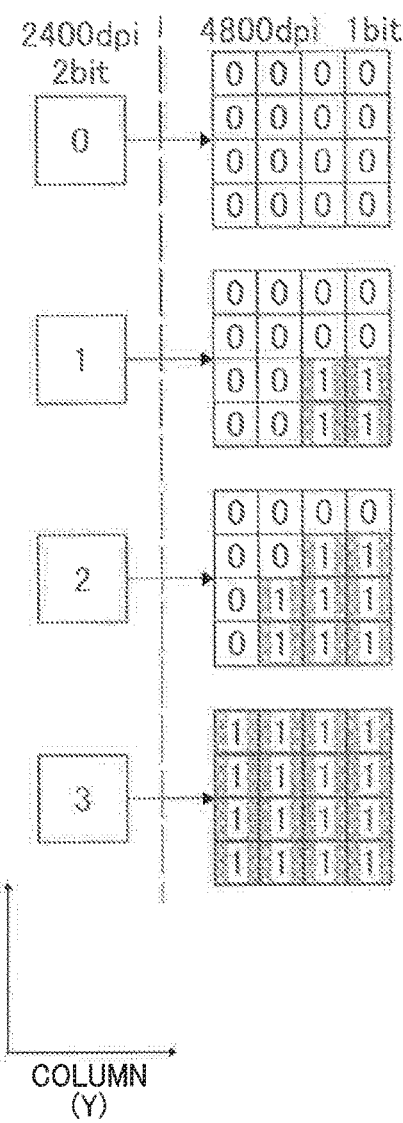

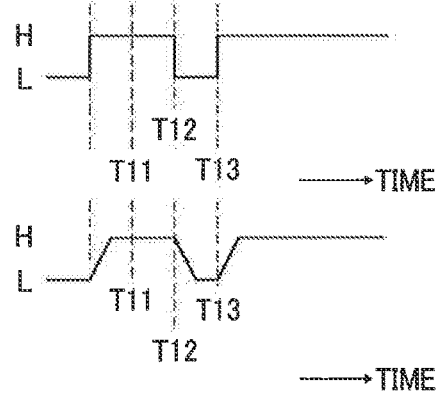
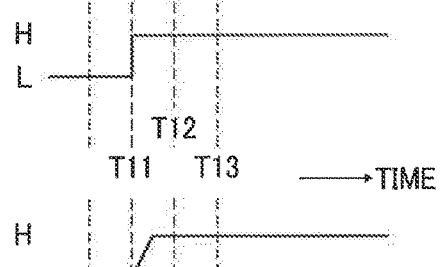
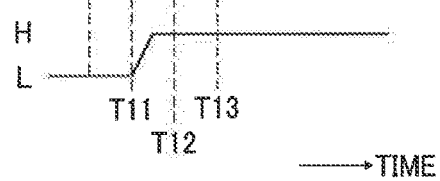

IMAGE FORMING APPARATUS AND IMAGE FORMING METHOD

CROSS-REFERENCE TO RELATED APPLICATION

This patent application is based on and claims priority pursuant to 35 U.S.C. § 119(a) to Japanese Patent Application No. 2016-107648, filed on May 30, 2016, in the Japan Patent Office, the entire disclosure of which is hereby incorporated by reference herein.

BACKGROUND

Technical Field

Embodiments of the present disclosure generally relate to an image forming apparatus and an image forming method, and more particularly, to an image forming apparatus for forming an image on a recording medium and an image forming method for forming an image on a recording medium.

Related Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor as an image bearer. An optical scanner irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium either directly, or indirectly via an intermediate transfer belt. Finally, a fixing device applies heat and pressure to the recording medium bearing the toner image to fix the toner image onto the recording medium. Thus, the image is formed on the recording medium.

An image forming apparatus that forms an image according to light emitted from a light source includes an image processing unit that generates image data having a first resolution and tag data. The tag data indicates whether to perform image processing assigned to each pixel included in the image data having the first resolution. The image forming apparatus converts the image data having the first resolution into image data having a second resolution higher than the first resolution. Based on a modulation signal according to the image data having the second resolution, the image forming apparatus drives the light source. According to the tag data, the image forming apparatus identifies a target pixel subjected to image processing out of the pixels included in the image data having the first resolution. According to the target pixel, the image forming apparatus generates a pixel pattern that is image-processed with the second resolution. In conversion of the image data having the first resolution into the image data having the second resolution, the image forming apparatus converts the target pixel of the image data having the first resolution into the image-processed pixel pattern thus generated. Thus, without increasing a transmission amount of the image data, the image forming apparatus performs image processing with a high resolution.

SUMMARY

In one embodiment of the present disclosure, a novel image forming apparatus is described that includes at least one photoconductor, a light source, and circuitry. The light source exposes the at least one photoconductor. The circuitry receives first image data and tag data. The first image data includes first pixels each indicating density of an image to be formed or one of turning on the light source and turning off the light source. The tag data indicates an attribute of each of the first pixels. The circuitry sets specific data to identify a first target pixel subjected to change out of the first pixels. The circuitry converts the first image data into second image data including second pixels. The second image data has a higher resolution than a resolution of the first image data. The circuitry also controls the light source according to the second image data to form the image. In conversion of the first image data into the second image data, the circuitry identifies a second target pixel corresponding to the first target pixel out of the second pixels of the second image data according to the specific data and the tag data, and changes the second target pixel into a pixel to turn on the light source, so as to generate the second image data.

Also described is a novel image forming method performed by the image forming apparatus.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein:

FIG. 12 is a diagram illustrating a pixel identified according to the specific data of FIG. 11A;

FIG. 14 is a diagram illustrating a pixel identified according to the specific data of FIG. 11C;

FIG. 22A is a diagram illustrating a first case of a second example of double-density processing performed by the image forming apparatus of FIG. 1;

FIG. 22B is a diagram illustrating a second case of the second example of double-density processing performed by the image forming apparatus of FIG. 1;

FIG. 24A is a diagram illustrating a first case of a fourth example of double-density processing performed by the image forming apparatus of FIG. 1;

FIG. 24B is a diagram illustrating a second case of the fourth example of double-density processing performed by the image forming apparatus of FIG. 1;

FIG. 25A is a diagram illustrating a first case of a fifth example of double-density processing performed by the image forming apparatus of FIG. 1;

FIG. 25B is a diagram illustrating a second case of the fifth example of double-density processing performed by the image forming apparatus of FIG. 1;

FIG. 26A is a diagram illustrating image data according to a comparative example of double-density processing;

FIG. 26B is a timing diagram illustrating control according to the comparative example of double-density processing;

FIG. 26C is a timing diagram illustrating actual action of a light source in response to the control of FIG. 26B;

FIG. 27A is a diagram illustrating an example of image data given the double-density processing by the image forming apparatus of FIG. 1;

FIG. 27B is a timing diagram illustrating control according to the double-density processing of FIG. 27A;

FIG. 27C is a timing diagram illustrating actual action of a light source in response to the control of FIG. 27B;

FIG. 32A is a diagram illustrating image data before a smoothing processing is performed by the image forming apparatus of FIG. 1;

FIG. 32B is a diagram illustrating image data after the smoothing processing is performed by the image forming apparatus of FIG. 1;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
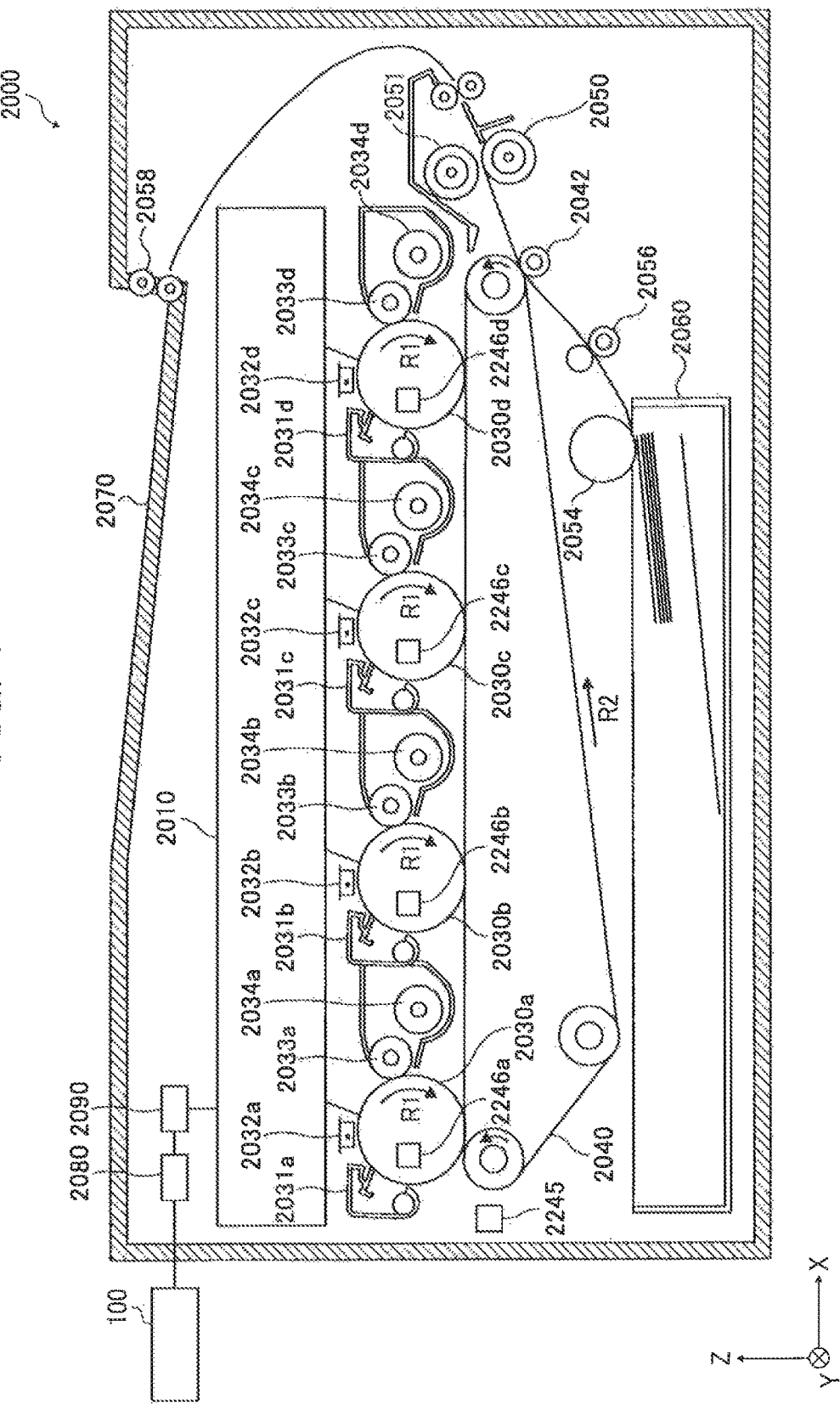
FIG. 1 is a schematic view of an image forming apparatus according to an embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes K, C, M, and Y denote colors black, cyan, magenta, and yellow, respectively. To simplify the description, these suffixes are omitted unless necessary.

Referring now to the drawings, embodiments of the present disclosure are described below.

Initially with reference to FIG. 1, a description is given of an image forming apparatus 2000 according to an embodiment of the present disclosure.

FIG. 1 is a schematic view of the image forming apparatus 2000. The image forming apparatus 2000 may be a copier, a facsimile machine, a printer, a multifunction peripheral or multifunction printer (MFP) having at least one of copying, printing, scanning, facsimile, and plotter functions, or the like. According to the present embodiment, the image forming apparatus 2000 is a color printer that forms color and monochrome toner images on a recording medium by electrophotography. Alternatively, the image forming apparatus 2000 may be a monochrome printer that forms a monochrome toner image on a recording medium.

Specifically, the image forming apparatus 2000 of FIG. 1 superimposes four color images of, e.g., black (K), cyan (C), magenta (M), and yellow (Y) one atop another to form a full color image on a recording medium such as a paper sheet. In short, the image forming apparatus 2000 is a tandem, multicolor printer.

As illustrated in, e.g., FIG. 1, in three-dimensional orthogonal coordinates XYZ, a direction of Y-axis (hereinafter referred to as a direction Y) is a longitudinal direction of photoconductive drums 2030 as photoconductors. A direction of X-axis (hereinafter referred to as a direction X) is a direction perpendicular to the direction Y. The photoconductive drums 2030 are arrayed in the direction X. A direction of Z-axis (hereinafter referred to as a direction Z) is a direction perpendicular to the directions X and Y. The direction Z is a vertical direction in FIG. 1. Hereinafter, the directions Y and X may be referred to as a main scanning direction and a sub-scanning direction, respectively.

The image forming apparatus 2000 includes an optical scanning control device 2010. The optical scanning control device 2010 includes, e.g., light sources that emit light and optical systems that scan the light emitted by the light sources. In other words, the optical scanning control device 2010 is an exposure device. The image forming apparatus 2000 includes, e.g., photoconductive drums 2030a, 2030b, 2030c, and 2030d to form different colors of toner images. Around the photoconductive drums 2030a, 2030b, 2030c, and 2030d are cleaners 2031a, 2031b, 2031c, and 2031d, chargers 2032a, 2032b, 2032c, and 2032d, developing rollers 2033a, 2033b, 2033c, and 2033d, and toner cartridges 2034a, 2034b, 2034c, and 2034d, respectively.

The image forming apparatus 2000 further includes, e.g., a transfer belt 2040, a transfer roller 2042, a fixing roller 2050, a pressure roller 2051, a sheet feeding roller 2054, a registration roller pair 2056, and a sheet ejection roller pair 2058. Furthermore, the image forming apparatus 2000 includes, e.g., a sheet tray 2060, an output tray 2070, a communication controller 2080, and a density detector 2245.

As illustrated in FIG. 1, the image forming apparatus 2000 includes home position sensors 2246a, 2246b, 2246c, and 2246d for the photoconductive drums 2030a, 2030b, 2030c, and 2030d, respectively. In addition, the image forming apparatus 2000 includes a printer controller 2090 that controls electric potential sensors and the hardware described above.

Hereinafter, the four photoconductive drums 2030a, 2030b, 2030c, and 2030d may be collectively referred to as the photoconductive drums 2030. Any one of the four photoconductive drums 2030a, 2030b, 2030c, and 2030d may be simply referred to as the photoconductive drum 2030. Similarly, the four developing rollers 2033a, 2033b, 2033c, and 2033d may be collectively referred to as the developing rollers 2033. Any one of the four developing rollers 2033a, 2033b, 2033c, and 2033d may be simply referred to as the developing roller 2033.

The image forming apparatus 2000 is coupled to an upstream device 100 (e.g., personal computer) via a network or the like. The communication controller 2080 allows bidirectional communication between the image forming apparatus 2000 and an external device (e.g., upstream device 100) via the network or the like.

The printer controller 2090 includes, e.g., a central processing unit (CPU), a read-only memory (ROM), random access memory (RAM), and analog-to-digital (A/D) converter. The CPU is a calculator and a controller. The ROM is a memory device that stores a program that enables the CPU to execute various types of processing and various kinds of data that the CPU uses. The RAM is a main memory device in which the CPU works. The A/D converter converts analog data to digital data.

The photoconductive drum 2030a, the charger 2032a, the developing roller 2033a, the toner cartridge 2034a, and the cleaner 2031a construct an image forming station K to form a black toner image. Hereinafter, the image forming station K may be simply referred to as the station K.

Similarly, the photoconductive drum 2030b, the charger 2032b, the developing roller 2033b, the toner cartridge 2034b, and the cleaner 2031b construct an image forming station C to form a cyan toner image. Hereinafter, the image forming station C may be simply referred to as the station C.

The photoconductive drum 2030c, the charger 2032c, the developing roller 2033c, the toner cartridge 2034c, and the cleaner 2031c construct an image forming station M to form a magenta toner image. Hereinafter, the image forming station M may be simply referred to as the station M.

The photoconductive drum 2030d, the charger 2032d, the developing roller 2033d, the toner cartridge 2034d, and the cleaner 2031d construct an image forming station Y to form a yellow toner image. Hereinafter, the image forming station Y may be simply referred to as the station Y.

Hereinafter, the four stations K, C, M, and Y may be collectively referred to as the stations. Any one of the four stations K, C, M, and Y may be simply referred to as the station.

The photoconductive drum 2030 has a photosensitive surface layer. The light source of the optical scanning control device 2010 irradiates the surface of the photoconductive drum 2030 with light. In other words, the light source of the optical scanning control device 2010 scans the surface of the photoconductive drum 2030. A rotation mechanism rotates the photoconductive drum 2030 in a direction of rotation R1 as illustrated in FIG. 1.

The charger 2032 charges the surface of the photoconductive drum 2030.

For example, in response to a request from, e.g., the upstream device 100, the printer controller 2090 controls the hardware to send image data transmitted from, e.g., the upstream device 100 to the optical scanning control device 2010.

According to the image data, the optical scanning control device 2010 irradiates the charged surface of the photoconductive drum 2030 with light. Specifically, the optical scanning control device 2010 irradiates the charged surface of each of the photoconductive drums 2030a, 2030b, 2030c, and 2030d with light beams modulated for each color. Irradiation of the surface of the photoconductive drum 2030 eliminates the charge of an irradiated portion on the surface of the photoconductive drum 2030, forming a latent image thereon according to the image data. As the photoconductive drum 2030 rotates, the latent image thus formed on the surface of the photoconductive drum 2030 moves to a position where the latent image faces the developing roller 2033. A detailed description of a construction of the optical scanning control device 2010 is deferred. A writing area in which the latent image is formed according to the image data may be referred to as an effective scanning area, an image forming area, an effective image area, or the like.

The toner cartridge 2034a accommodates black toner. The black toner is supplied to the developing roller 2033a. Similarly, the toner cartridge 2034b accommodates cyan toner. The cyan toner is supplied to the developing roller 2033b. The toner cartridge 2034c accommodates magenta toner. The magenta toner is supplied to the developing roller 2033c. The toner cartridge 2034d accommodates yellow toner. The yellow toner is supplied to the developing roller 2033d.

As the developing roller 2033 rotates, the toner supplied from the toner cartridge 2034 is applied to the surface of the photoconductive drum 2030. When the toner carried by the developing roller 2033 contacts the surface of the photoconductive drum 2030, the toner adhere to the irradiated surface of the photoconductive drum 2030. In other words, the developing roller 2033 allows the toner to adhere to the latent image formed on the surface of the photoconductive drum 2030, rendering the latent image visible as a toner image. Thus, the toner image is formed on the surface of the photoconductive drum 2030. As the photoconductive drum 2030 rotates, the toner image is transferred onto the transfer belt 2040 from the photoconductive drum 2030. Thus, a charging process, a latent image formation process, and a primary transfer process are performed for each color. In the primary transfer process, black, cyan, magenta, and yellow toner images are timed to be transferred sequentially on the transfer belt 2040 such that the black, cyan, magenta, and yellow toner images are superimposed one atop another on the transfer belt 2040 that rotates in a direction of rotation R2. Thus, a composite color toner image is formed on the transfer belt 2040.

In a lower portion of the image forming apparatus 2000 is the sheet tray 2060 that accommodates recording media such as paper sheets. The sheet feeding roller 2054 is disposed near the sheet tray 2060. The sheet feeding roller 2054 picks up the recording media one at a time from the sheet tray 2060. The recording medium thus picked up is conveyed to the registration roller pair 2056. Activation of the registration roller pair 2056 is timed to convey the recording medium to an area of contact herein referred to as a secondary transfer nip between the transfer belt 2040 and the transfer roller 2042 such that the recording medium meets the color toner image formed on the transfer belt 2040 at the secondary transfer nip. Accordingly, the color toner image is transferred onto the recording medium at the secondary transfer nip. The recording medium bearing the color toner image is then conveyed to an area of contact herein referred to as a fixing nip between the fixing roller 2050 and the pressure roller 2051.

The recording medium bearing the color toner image receives heat and pressure at the fixing nip. Accordingly, the color toner image is fixed onto the recording medium. Thereafter, the recording medium is conveyed to the sheet ejection roller pair 2058. The sheet ejection roller pair 2058 ejects the recording medium onto the output tray 2070. Thus, recording media rest on the output tray 2070 one by one.

The cleaner 2031 removes residual toner, which has failed to be transferred onto the transfer belt 2040 and therefore remaining on the photoconductive drum 2030, from the photoconductive drum 2030. Thus, the cleaner 2031 cleans the surface of the photoconductive drum 2030. As the photoconductive drum 2030 rotates, the cleaned surface of the photoconductive drum 2030 returns to a position where the surface of the photoconductive drum 2030 faces the charger 2032 for a next image forming process.

The home position sensor 2246 detects a predetermined position (hereinafter referred to as a home position) of the photoconductive drum 2030.

Figure 2:
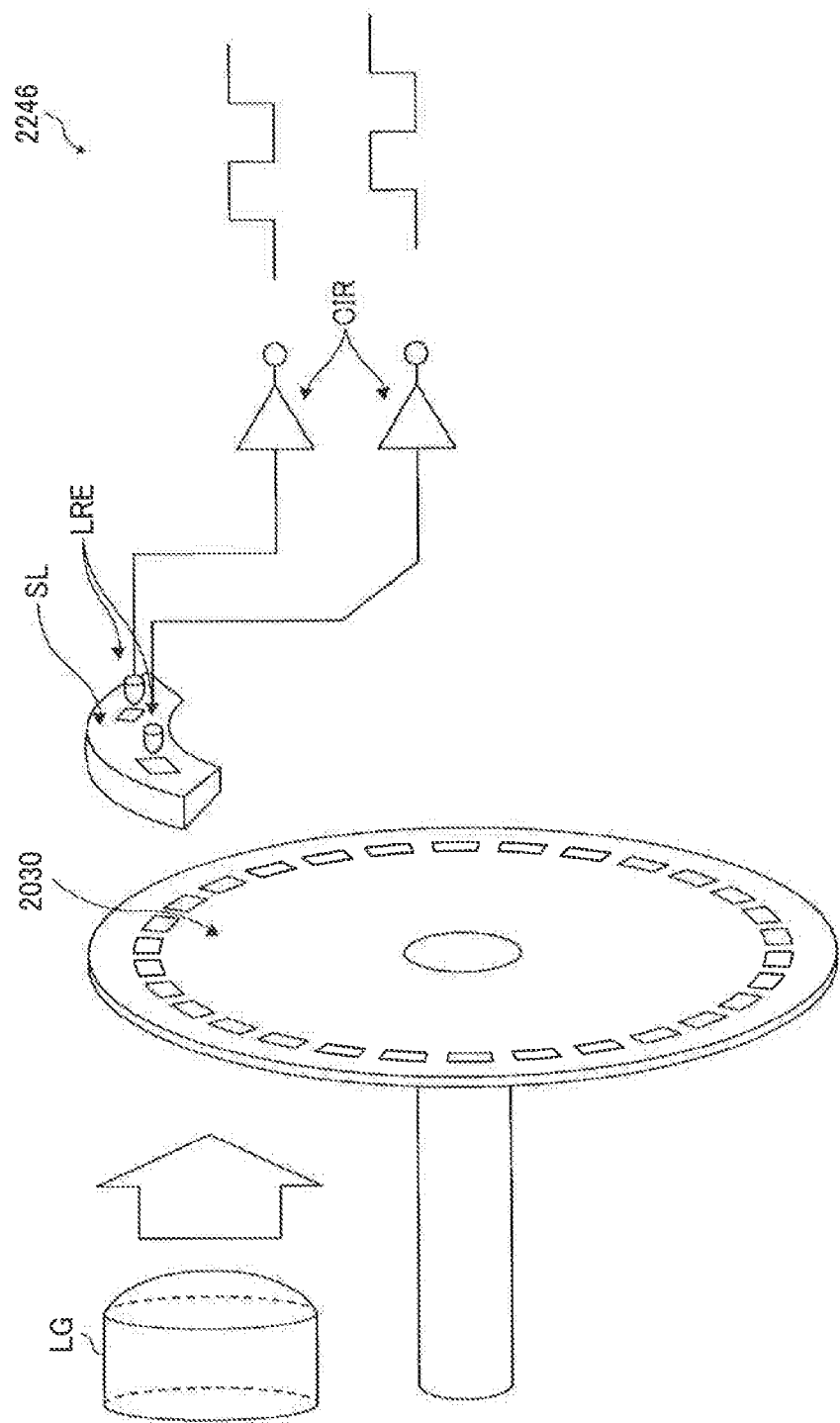
FIG. 2 is a schematic diagram of a photoconductive drum and a home position sensor incorporated in the image forming apparatus of FIG. 1.

FIG. 2 is a schematic diagram of the photoconductive drum 2030 and the home position sensor 2246. As illustrated in FIG. 2, the home position sensor 2246 includes, e.g., a light source LG such as a light emitting diode (LED), a stationary slit SL, a light receiving element LRE, and a waveform shaping circuit CIR. In the present example of FIG. 2, the photoconductive drum 2030 includes holes. The light emitted from the light source LG is transmitted through the holes of the photoconductive drum 2030 and stationary slit SL. Then, the light receiving element LRE detects the transmitted light. An output waveform of the waveform shaping circuit CIR indicates the reading of the light receiving device LRE. In the present example, the light receiving element LRE detects the transmitted light. Alternatively, the light receiving element LRE may detect reflected light, for example.

The photoconductive drum 2030 includes, e.g., a mark or a projection indicative of the home position. Detection of such a mark or projection indicative of the home position allows the image forming apparatus 2000 to recognize that the photoconductive drum 2030 starts rotation from the home position and finishes the rotation at the home position, for example. The home position sensor 2246 detects the home position of the photoconductive drum 2030 electrically or mechanically, or both electrically and mechanically. For example, if the projection is indicative of the home position, the home position sensor 2246 is a touch sensor that detects the projection mechanically. By contrast, if the mark is indicative of the home position, the home position sensor 2246 is an optical sensor that detects the mark electrically.

In the image forming apparatus 2000, the home position sensors 2246a, 2246b, 2246c, and 2246d detects the home position of the photoconductive drums 2030a, 2030b, 2030c, and 2030d, respectively. Specifically, the home position sensor 2246a detects a home position of rotation of the photoconductive drum 2030a. Similarly, the home position sensor 2246b detects a home position of rotation of the photoconductive drum 2030b. The home position sensor 2246c detects a home position of rotation of the photoconductive drum 2030c. The home position sensor 2246d detects a home position of rotation of the photoconductive drum 2030d.

The image forming apparatus 2000 includes an electric potential sensor for each of the photoconductive drums 2030. The electric potential sensor measures the surface of the photoconductive drum 2030 and indicates a surface potential of the photoconductive drum 2030. For example, the potential sensor is disposed opposite the photoconductive drum 2030.

Figure 3:
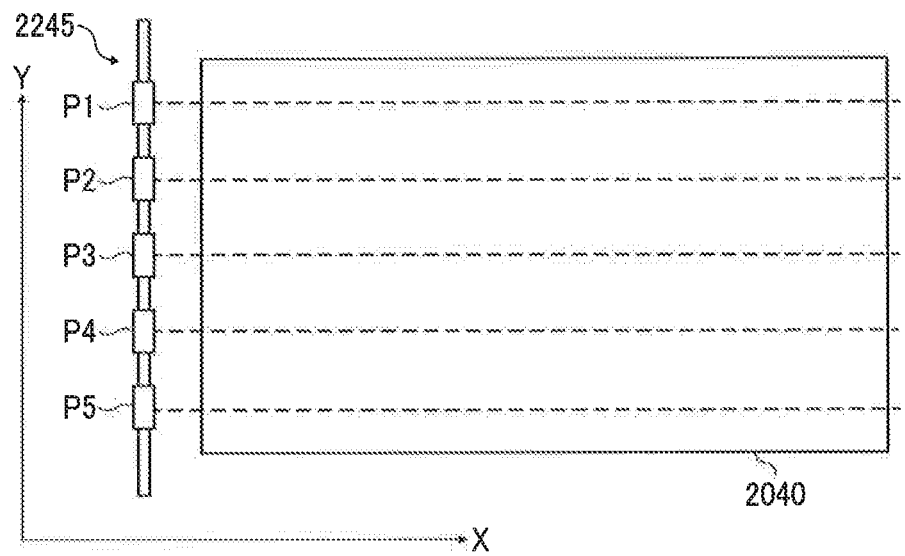
FIG. 3 is a schematic view of a density detector and a transfer belt incorporated in the image forming apparatus of FIG. 1, illustrating an example of relative positions thereof.

Referring now to FIG. 3, a description is given of a construction and a location of the density detector 2245 that detects image density.

FIG. 3 is a schematic view of the density detector 2245 and the transfer belt 2040, illustrating an example of relative positions thereof. For example, as illustrated in FIG. 3, the density detector 2245 includes five optical sensors P1, P2, P3, P4, and P5. In the present example, the density detector 2245 includes the five optical sensors P1, P2, P3, P4, and P5. However, the number of the optical sensors P is not limited to five. Alternatively, the density detector 2245 may include three optical sensors, for example.

Hereinafter, the five optical sensors P1, P2, P3, P4, and P5 may be collectively referred to as the optical sensors P. Any one of the five optical sensors P1, P2, P3, P4, and P5 may be simply referred to as the optical sensor P.

Specifically, the optical sensors P1, P2, P3, P4, and P5 are disposed facing the effective image area in the direction Y, which is a direction perpendicular to the direction of rotation R2 of the transfer belt 2040.

Figure 4:
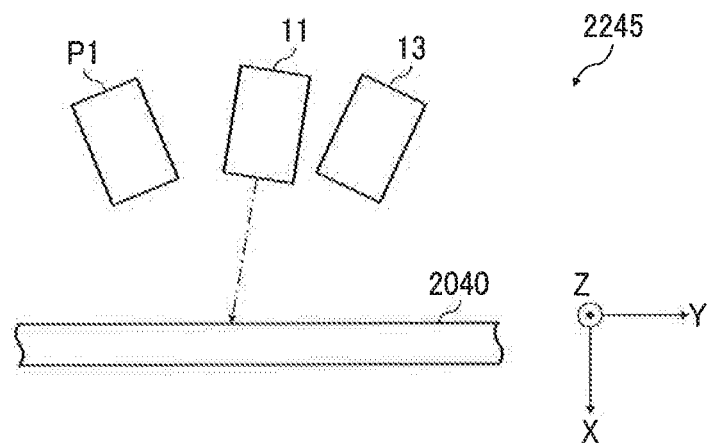
FIG. 4 is a schematic view of the density detector and the transfer belt, illustrating how the density sensor detects image density.

Referring now to FIG. 4, a description is given of how the density detector 2245 detects the image density. FIG. 4 is a schematic view of the density detector 2245 and the transfer belt 2040. With the optical sensors P1, P2, P3, P4, and P5, the density detector 2245 detects the image density as illustrated in FIG. 4, for example. The optical sensor P1 is described below as a representative of the optical sensors P1, P2, P3, P4, and P5.

The density detector 2245 includes a light source such as an LED 11. The LED 11 irradiates the transfer belt 2040 with light. The light emitted by the LED 11 is reflected from the transfer belt 2040 or a toner image formed on the transfer belt 2040. The optical sensor P1 receives the light thus reflected if the light is reflected specularly, for example. According to the light received, the optical sensor P1 outputs a signal that indicates an amount of light received. That is, different signals indicate different amounts of light received, depending on the amount of toner contained in the toner image on the transfer belt 2040. Accordingly, the image forming apparatus 2000 detects the image density through the signals.

In the present example, the density detector 2245 includes a plurality of optical sensors. In FIG. 4, the density detector 2245 includes the optical sensor P1 and an optical sensor 13. Specifically, the optical sensor 13 detects the light reflected from, e.g., the transfer belt 2040 at many angles rather than at just one angle as in the case of specular reflection. In short, the optical sensor 13 is a sensor that detects diffusely reflected light. Similar to the optical sensor P1, the optical sensor 13 receives the light and outputs a signal that indicates an amount of light received. Specifically, an amount of a color toner image is calculated based on the specularly reflected light and the diffusely reflected light. By contrast, an amount of a black toner image is calculated based only on the specularly reflected light.

Referring now to FIGS. 5 through 8, a description is given of the optical scanning control device 2010.

Figure 5:
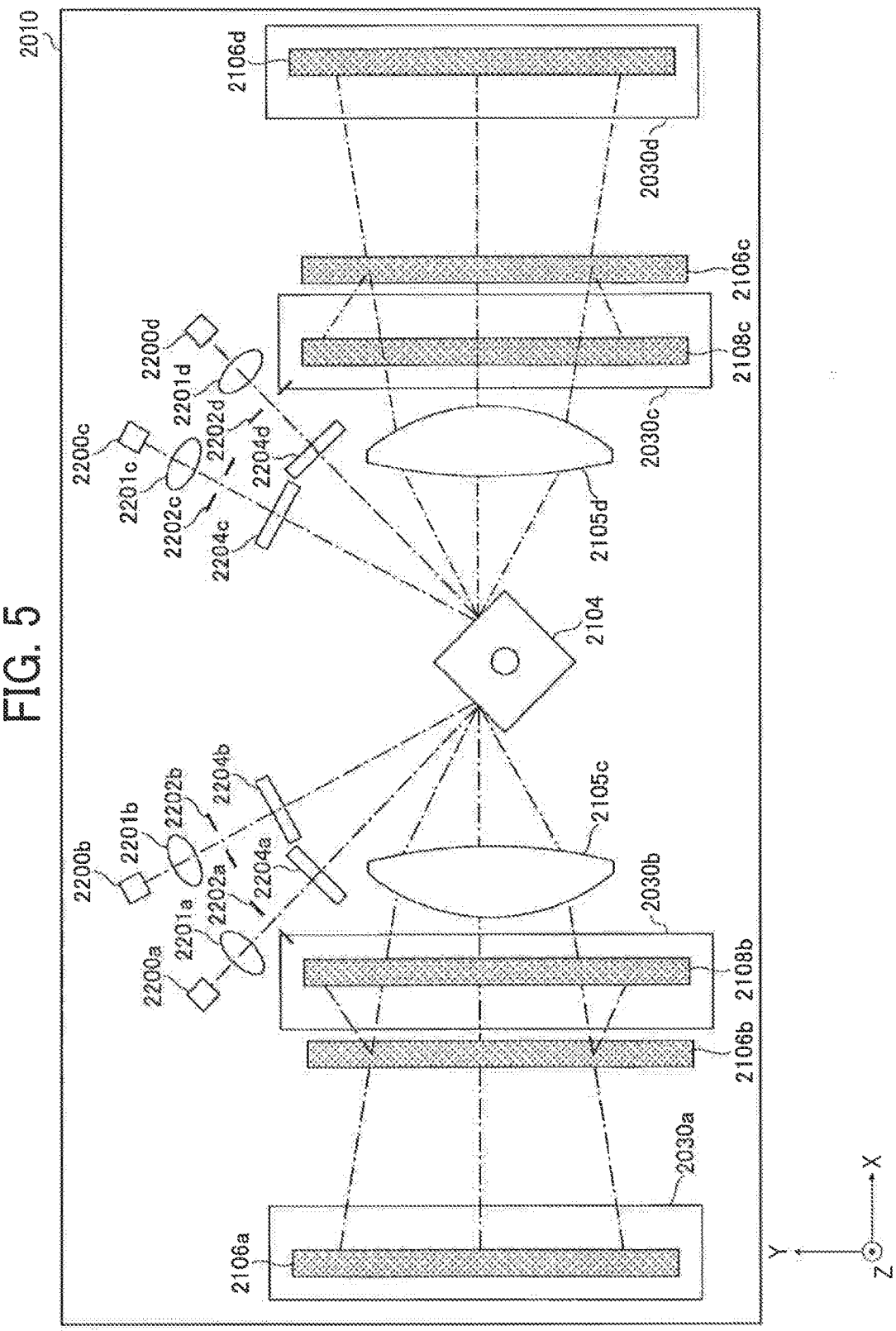
FIG. 5 is a schematic view of an optical scanning control device incorporated in the image forming apparatus of FIG. 1.

FIG. 5 is a schematic view of the optical scanning control device 2010.

Figure 6:
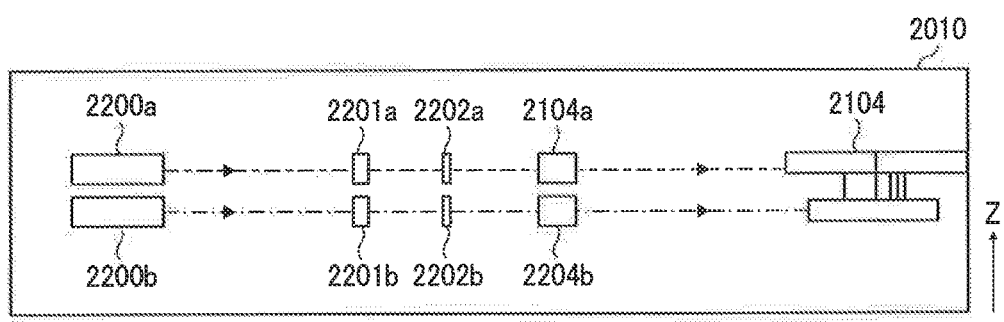
FIG. 6 is a partial view of the optical scanning control device of FIG. 5.

FIG. 6 is a partial view of the optical scanning control device 2010 of FIG. 5.

Figure 7:
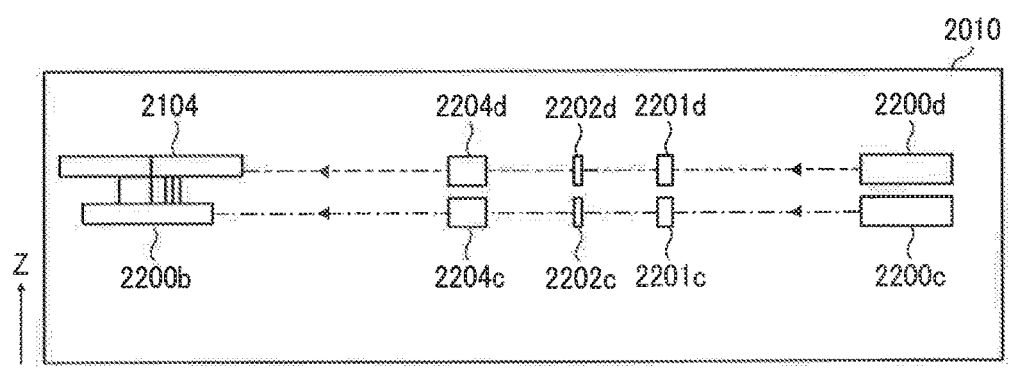
FIG. 7 is another partial view of the optical scanning control device of FIG. 5.

FIG. 7 is another partial view of the optical scanning control device 2010 of FIG. 5.

Figure 8:
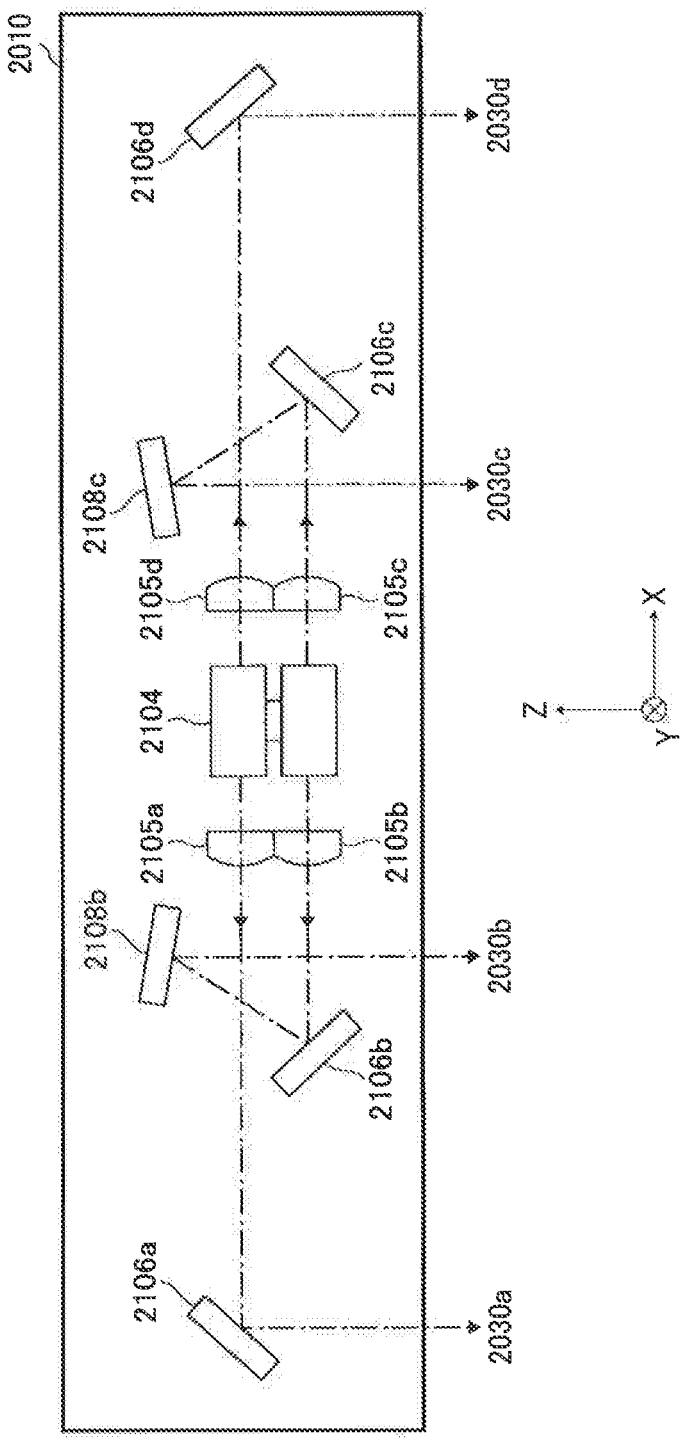
FIG. 8 is yet another partial view of the optical scanning control device of FIG. 5.

FIG. 8 is yet another partial view of the optical scanning control device 2010 of FIG. 5.

The optical scanning control device 2010 includes, e.g., light sources 2200a, 2200b, 2200c, and 2200d, coupling lenses 2201a, 2201b, 2201c, and 2201d, aperture plates 2202a, 2202b, 2202c, and 2202d, and cylindrical lenses 2204a, 2204b, 2204c, and 2204d. The optical scanning control device 2010 further includes, a polygon mirror 2104, scanning lenses 2105a, 2105b, 2105c, and 2105d, deflection mirrors 2106a, 2106b, 2106c, 2106d, 2108b, and 2108c.

Hereinafter, the four light sources 2200a, 2200b, 2200c, and 2200d may be collectively referred to as the light sources 2200. Any one of the four light sources 2200a, 2200b, 2200c, and 2200d may be simply referred to as the light source 2200.

The light source 2200 includes, e.g., a surface emitting laser array having a plurality of light emitting units arrayed two-dimensionally. For example, the surface emitting laser array has 40 light emitting units. The light emitting units of the surface emitting laser array are disposed such that the light emitting units are arrayed at equal intervals when all the light emitting units are projected in the sub-scanning direction, for example. That is, the light emitting units of the surface emitting laser array are disposed at intervals at least in the sub-scanning direction. Hereinafter, a distance between centers of any two of the light emitting units may be referred to as an interval between the light emitting units.

The coupling lens 2201a is disposed on an optical path of a luminous flux emitted from the light source 2200a. The coupling lens 2201a turns the luminous flux into substantially parallel luminous flux. Similarly, the coupling lens 2201b is disposed on an optical path of a luminous flux emitted from the light source 2200b. The coupling lens 2201b turns the luminous flux into substantially parallel luminous flux. The coupling lens 2201c is disposed on an optical path of a luminous flux emitted from the light source 2200c. The coupling lens 2201c turns the luminous flux into substantially parallel luminous flux. The coupling lens 2201d is disposed on an optical path of a luminous flux emitted from the light source 2200d. The coupling lens 2201d turns the luminous flux into substantially parallel luminous flux.

The aperture plate 2202a has an opening to limit the amount of luminous flux passing through the coupling lens 2201a. Similarly, the aperture plate 2202b has an opening to limit the amount of luminous flux passing through the coupling lens 2201b. The aperture plate 2202c has an opening to limit the amount of luminous flux passing through the coupling lens 2201c. The aperture plate 2202d has an opening to limit the amount of luminous flux passing through the coupling lens 2201d.

The cylindrical lens 2204a images the luminous flux passing through the opening of the aperture plate 2202a on a reflective surface of the polygon mirror 2104 or on a nearby area thereof, in the direction Z. The cylindrical lens 2204b images the luminous flux passing through the opening of the aperture plate 2202b on the reflective surface of the polygon mirror 2104 or on the nearby area thereof, in the direction Z. The cylindrical lens 2204c images the luminous flux passing through the opening of the aperture plate 2202c on the reflective surface of the polygon mirror 2104 or on the nearby area thereof, in the direction Z. The cylindrical lens 2204d images the luminous flux passing through the opening of the aperture plate 2202d on the reflective surface of the polygon mirror 2104 or on the nearby area thereof, in the direction Z.

The coupling lens 2201a, the aperture plate 2202a, and the cylindrical lens 2204a constructs a pre-deflector optical system for the station K. The coupling lens 2201b, the aperture plate 2202b, and the cylindrical lens 2204b constructs a pre-deflector optical system for the station C. The coupling lens 2201c, the aperture plate 2202c, and the cylindrical lens 2204c constructs a pre-deflector optical system for the station M. The coupling lens 2201c, the aperture plate 2202c, and the cylindrical lens 2204c constructs a pre-deflector optical system for the station Y.

The polygon mirror 2104 rotates about the Z-axis. As illustrated in, e.g., FIG. 8, the polygon mirror 2104 has a two-story structure in the direction Z. The polygon mirror 2104 includes a four-sided mirror having four deflection surfaces for each story. The four-sided mirror of a first story of the polygon mirror 2104 deflects the luminous flux from the cylindrical lens 2204b and the luminous flux from the cylindrical lens 2204c. On the other hand, the four-sided mirror of a second story of the polygon mirror 2104 deflects the luminous flux from the cylindrical lens 2204a and the luminous flux from the cylindrical lens 2204d. It is to be noted that the luminous flux from the cylindrical lens 2204a and the luminous flux from the cylindrical lens 2204b are deflected in a negative (−) direction of the X-axis from a location of the polygon mirror 2104. On the other hand, the luminous flux from the cylindrical lens 2204c and the luminous flux from the cylindrical lens 2204d are deflected in a positive (+) direction of the X-axis from the location of the polygon mirror 2104.

The scanning lenses 2105a, 2105b, 2105c, and 2105d condense the luminous fluxes on the photoconductive drums 2030a, 2030b, 2030c, and 2030d, respectively. Control is performed such that an optical spot moves on the surface of the photoconductive drum 2030 at a constant speed in the main scanning direction in accordance with rotation of the polygon mirror 2104.

Specifically, first, the scanning lenses 2105a and 2105b are disposed on a negative (−) side of the X-axis from the location of the polygon mirror 2104. On the other hand, the scanning lenses 2105c and 2105d are disposed on a positive (+) side of the X-axis from the location of the polygon mirror 2104.

The scanning lens 2105a rests on the scanning lens 2105b in the direction Z. The scanning lens 2105b is disposed opposite the four-sided mirror of the first story of the polygon mirror 2104. On the other hand, the scanning lens 2105a is disposed opposite the four-sided mirror of the second story of the polygon mirror 2104. Similarly, the scanning lens 2105d rests on the scanning lens 2105c in the direction Z. The scanning lens 2105c is disposed opposite the four-sided mirror of the first story of the polygon mirror 2104. On the other hand, the scanning lens 2105d is disposed opposite the four-sided mirror of the second story of the polygon mirror 2104.

The luminous flux passing through the cylindrical lens 2204a and deflected by the polygon mirror 2104 reaches the photoconductive drum 2030a via the scanning lens 2105a and the deflection mirror 2106a. Thus, the photoconductive drum 2030a is irradiated with the luminous flux, forming an optical spot on the photoconductive drum 2030a. As the polygon mirror 2104 rotates, the optical spot moves in the longitudinal direction of the photoconductive drum 2030a. That is, the optical spot is scanned on the photoconductive drum 2030a in accordance with the rotation of the polygon mirror 2104.

It is to be noted that the main scanning direction is the direction in which the optical spot moves. The sub-scanning direction is the rotation direction R1 of the photoconductive drum 2030a.

Similarly, the luminous flux passing through the cylindrical lens 2204b and deflected by the polygon mirror 2104 reaches the photoconductive drum 2030b via the scanning lens 2105b and the deflection mirrors 2106b and 2108b. Thus, the photoconductive drum 2030b is irradiated with the luminous flux, forming an optical spot on the photoconductive drum 2030b. As the polygon mirror 2104 rotates, the optical spot moves in the longitudinal direction of the photoconductive drum 2030b. That is, the optical spot is scanned on the photoconductive drum 2030b in accordance with the rotation of the polygon mirror 2104.

It is to be noted that the main scanning direction is the direction in which the optical spot moves. The sub-scanning direction is the rotation direction R1 of the photoconductive drum 2030b.

Similarly, the luminous flux passing through the cylindrical lens 2204c and deflected by the polygon mirror 2104 reaches the photoconductive drum 2030c via the scanning lens 2105c and the deflection mirrors 2106c and 2108c. Thus, the photoconductive drum 2030c is irradiated with the luminous flux, forming an optical spot on the photoconductive drum 2030c. As the polygon mirror 2104 rotates, the optical spot moves in the longitudinal direction of the photoconductive drum 2030c. That is, the optical spot is scanned on the photoconductive drum 2030c in accordance with the rotation of the polygon mirror 2104.

It is to be noted that the main scanning direction is the direction in which the optical spot moves. The sub-scanning direction is the rotation direction R1 of the photoconductive drum 2030c.

Similarly, the luminous flux passing through the cylindrical lens 2204d and deflected by the polygon mirror 2104 reaches the photoconductive drum 2030d via the scanning lens 2105d and the deflection mirror 2106d. Thus, the photoconductive drum 2030d is irradiated with the luminous flux, forming an optical spot on the photoconductive drum 2030d. As the polygon mirror 2104 rotates, the optical spot moves in the longitudinal direction of the photoconductive drum 2030d. That is, the optical spot is scanned on the photoconductive drum 2030d in accordance with the rotation of the polygon mirror 2104.

It is to be noted that the main scanning direction is the direction in which the optical spot moves. The sub-scanning direction is the rotation direction R1 of the photoconductive drum 2030d.

The deflection mirrors 2106 are disposed such that the optical paths have identical lengths from the polygon mirror 2104 to the respective photoconductive drums 2030. In addition, the deflection mirrors 2106 are disposed such that the luminous fluxes enter identical positions on the respective photoconductive drums 2030 at identical angles of incidence.

Optical systems disposed on the optical paths between the polygon mirror 2104 and the respective photoconductive drums 2030 are referred to as scanning optical systems. In the present example, the scanning optical system for the station K includes, e.g., the scanning lens 2105a and the deflection mirror 2106a. The scanning optical system for the station C includes, e.g., the scanning lens 2105b and the deflection mirrors 2106b and 2108b. The scanning optical system for the station M includes, e.g., the scanning lens 2105*c* and the deflection mirrors 2106*c* and 2108*c*. The scanning optical system for the station Y includes, e.g., the scanning lens 2105*d* and the deflection mirror 2106*d*. In the present embodiment, each of the scanning optical systems include a single scanning lens 2105. Alternatively, each of the scanning optical systems may include a plurality of scanning lenses 2105.

Figure 9:
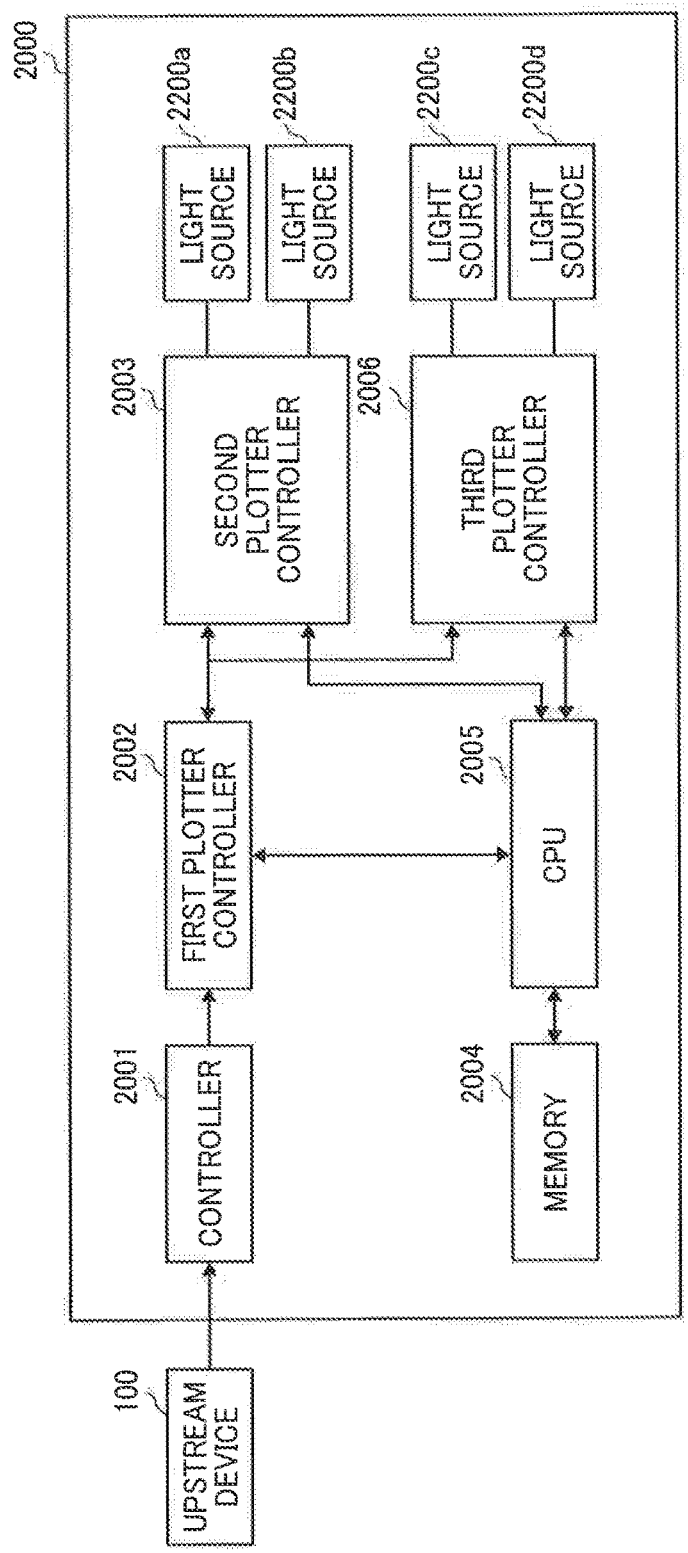
FIG. 9 is a block diagram illustrating a hardware structure of the image forming apparatus of FIG. 1.

Referring now to FIG. 9, a description is given of a hardware structure of the image forming apparatus 2000.

FIG. 9 is a block diagram illustrating an example of the hardware structure of the image forming apparatus 2000. The image forming apparatus 2000 includes, e.g., a controller 2001, a first plotter controller 2002, a second plotter controller 2003, a memory 2004, a central processing unit (CPU) 2005, and a third plotter controller 2006.

The upstream device 100 is coupled to the image forming apparatus 2000 via a network, a cable, or radio communication. The upstream device 100 transmits an order to form an image, that is, a printing request, according to, e.g., manual instruction from a user. With the printing request, the upstream device 100 transmits image data to the controller 2001 of the image forming apparatus 2000. The image data indicates an image to be formed by the image forming apparatus 2000.

The controller 2001 is, e.g., an electronic circuit board mounting a CPU. For example, the controller 2001 performs gradation processing, such as dithering, and image processing, such as converting image data transmitted from the upstream device 100 into bitmap data. The controller 2001 may be coupled to, e.g., an image deployment device that deploys image data transmitted from the controller 2001.

Each of the first plotter controller 2002, the second plotter controller 2003, and the third plotter controller 2006 is a programmable logic device (PLD), such as an application specific integrated circuit (ASIC) or a field-programmable gate array (FPGA). Alternatively, each of the first plotter controller 2002, the second plotter controller 2003, and the third plotter controller 2006 may be a combination of the ASIC and the FPGA. The first plotter controller 2002 performs various types of processing. A part of the processing performed by the first plotter controller 2002 may be executed by, e.g., firmware.

The various types of processing performed by the first plotter controller 2002 include, e.g., pattern adding and image processing such as trimming. In the pattern adding, e.g., an anti-counterfeit pattern, a test pattern, or an adjustment pattern is added. The adjustment pattern is, e.g., a pattern for adjusting density, a pattern for correcting color shift, or a pattern for avoiding being caught by a blade. The image processing may include a skew correction. In addition, the first plotter controller 2002 performs, e.g., noise canceling, pixel counting, image data capacity measurement, conversion of 8 bit data into 10 bit data, and conversion of parallel data into serial data.

The second plotter controller 2003 and the third plotter controller 2006 perform various types of processing similar to those described above. In FIG. 9, each of the light sources 2200 is used to form a single color image. For example, the light source 2200*a* is used to form an image of black among the four colors, namely, black, cyan, magenta, and yellow. The light source 2200*b* is used to form an image of magenta among the four colors, namely, black, cyan, magenta, and yellow. The light source 2200*c* is used to form an image of cyan among the four colors, namely, black, cyan, magenta, and yellow. The light source 2200*d* is used to form an image of yellow among the four colors, namely, black, cyan, magenta, and yellow. Each of the second plotter controller 2003 and the third plotter controller 2006 controls two light sources 2200. In the present example of FIG. 9, the second plotter controller 2003 controls the light sources 2200*a* and 2200*b*. The third plotter controller 2006 controls the light sources 2200*c* and 2200*d*. Alternatively, the second plotter controller 2003 and third plotter controller 2006 may control the light sources 2200 different from those illustrated in FIG. 9. That is, the combination of the colors of the light sources 2200 is not limited to that illustrated in FIG. 9. Each of the second plotter controller 2003 and the third plotter controller 2006 includes a controller or circuitry such as a driver that controls the light sources 2200.

A description is now given of an example in which the second plotter controller 2003 controls the light source 2200*a* to form a black image. It is to be noted that the image forming apparatus 2000 may be given a predetermined parameter for each color. According to the predetermined parameter, individual processing may be performed for each color.

First, the second plotter controller 2003 receives image data (hereinafter referred to as first image data) from the first plotter controller 2002. Specifically, the second plotter controller 2003 receives the first image data through, e.g., low voltage differential signaling (LVDS). If the first plotter controller 2002 converts 8 bit data into 10 bit data and transmits the data thus converted to the second plotter controller 2003, the second plotter controller 2003 then converts the 10 bit data into 8 bit data. The second plotter controller 2003 converts the first image data into a data format that conforms to an emission resolution of the light source 2200*a*.

The light source 2200*a* is, e.g., a laser array of vertical cavity surface emitting lasers (VCSELs). Accordingly, the light source 2200*a* exhibits a relatively high emission resolution of, e.g., 2400 dots per inch (dpi) in the main scanning direction and 4800 dpi in the sub-scanning direction.

For example, if the first image data has a resolution of 2400 dpi and the emission resolution is 4800 dpi, the second plotter controller 2003 performs double-density processing with respect to the first image data, thereby converting the first image data into image data (hereinafter referred to as second image data) having a higher resolution than the resolution of the first image data. Thus, the second plotter controller 2003 generates the second image data. Such conversion of the first image data into the second image data having a higher resolution than the resolution of the first image data is implemented by use of, e.g., lookup table (LUT) data. Alternatively, each pixel included in the first image data (hereinafter referred to as a first pixel) may be converted into two pixels to generate the second image data having a higher resolution than the resolution of the first image data.

Thus, the second plotter controller 2003 converts the first image data into the second image data. A detailed description of an order of the conversion is deferred. According to the second image data thus generated, the second plotter controller 2003 then controls the light source 2200*a* to form an image.

Figure 10:
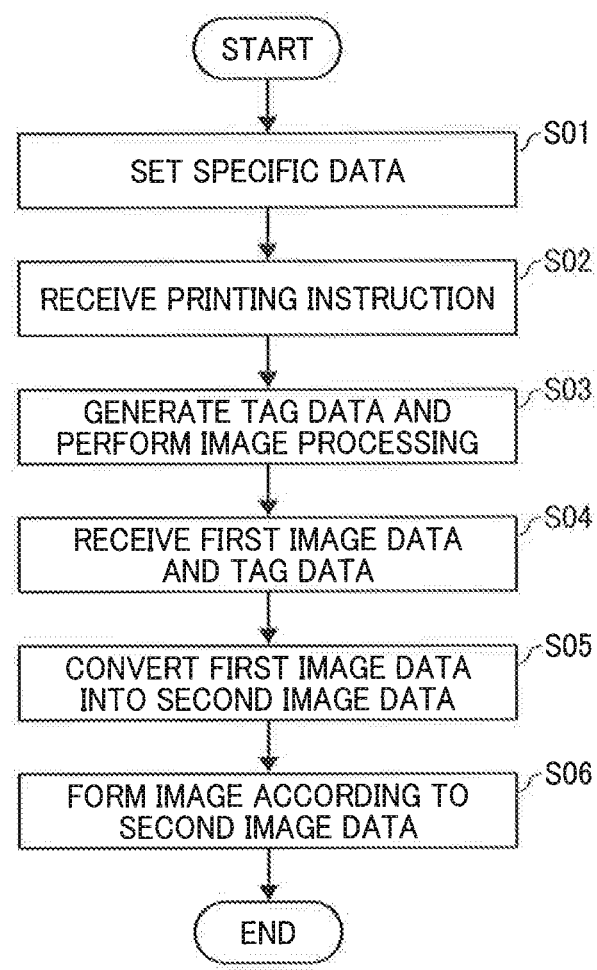
FIG. 10 is a flowchart illustrating entire processing performed by the image forming apparatus of FIG. 1.

Referring now to FIG. 10, a description is given of entire processing performed by the image forming apparatus 2000.

FIG. 10 is a flowchart illustrating the entire processing performed by the image forming apparatus 2000. For example, the image forming apparatus 2000 forms an image by an image forming method illustrated in FIG. 10. In the present example, resolutions of the first image data and the second image data are 2400 dpi and 4800 dpi, respectively, in a column direction (i.e., direction Y, main scanning direction).

Now, a description is given of step S01, which is setting specific data.

In step S01, the image forming apparatus 2000 sets specific data. If pattern matching is performed, for example, the specific data indicates a pattern detected by the pattern matching. The specific data is as follows, for example.

Figure 11A:
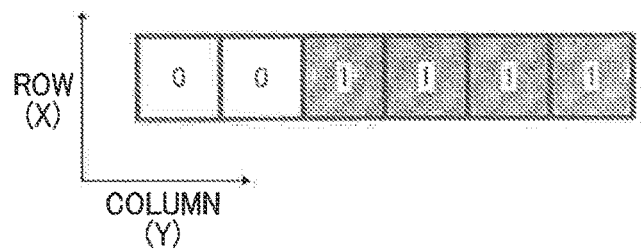
FIG. 11A is a diagram illustrating a first example of specific data.
Figure 11B:
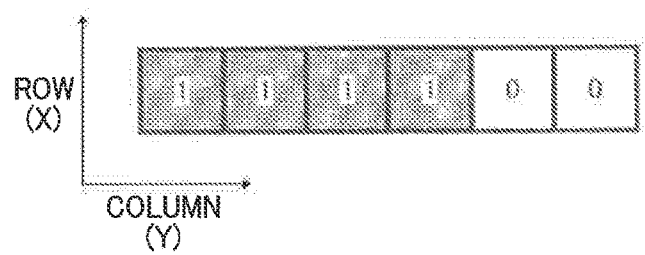
FIG. 11B is a diagram illustrating a second example of specific data.
Figure 11C:
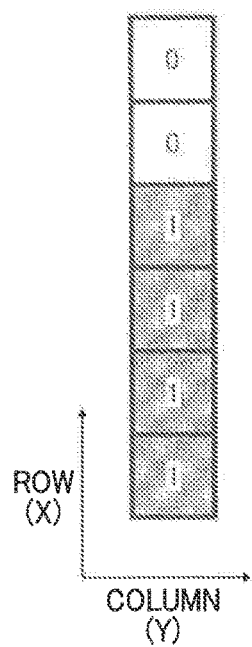
FIG. 11C is a diagram illustrating a third example of specific data.
Figure 11D:
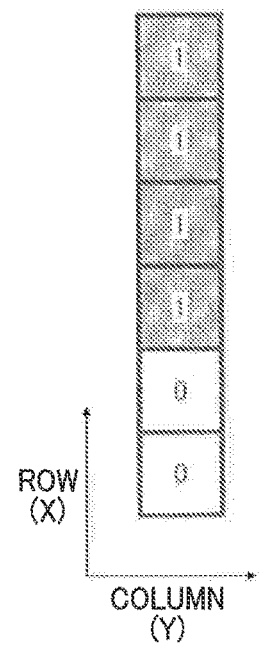
FIG. 11D is a diagram illustrating a fourth example of specific data.

Referring now to FIGS. 11A through 11D, a description is given of four examples of the specific data. FIG. 11A is a diagram illustrating a first example of the specific data. FIG. 11B is a diagram illustrating a second example of the specific data. FIG. 11C is a diagram illustrating a third example of the specific data. FIG. 11D is a diagram illustrating a fourth example of the specific data. Each of the specific data illustrated in FIGS. 11A through 11D includes 6 pixels with a resolution of 2400 dpi. Each pixel is 1 bit data. Specifically, if a pixel indicates "0", the pixel indicates turning off the light source 2200. That is, the pixel "0" indicates that a part corresponding to the pixel is white, provided that the recording medium to bear an image is white, because toner does not adhere to the part corresponding to the pixel. On the other hand, if a pixel indicates "1", the pixel indicates turning on the light source 2200. That is, the pixel "1" indicates that a part corresponding to the pixel is black because black toner adheres to the part corresponding to the pixel. It is to be noted that the pixel "0" and the pixel "1" may be selectively set in the image forming apparatus 2000 in advance so as to indicate the part corresponding to the pixel is black. The specific data is not limited to 6-pixel data. For example, the specific data may be set based on, e.g., the resolution of the first data or the thickness of a target edge. In short, the specific data may include any number of pixels.

Specifically, if the specific data as illustrated in FIG. 11A is set, the image forming apparatus 2000 identifies a pixel as follows.

Figure 12:
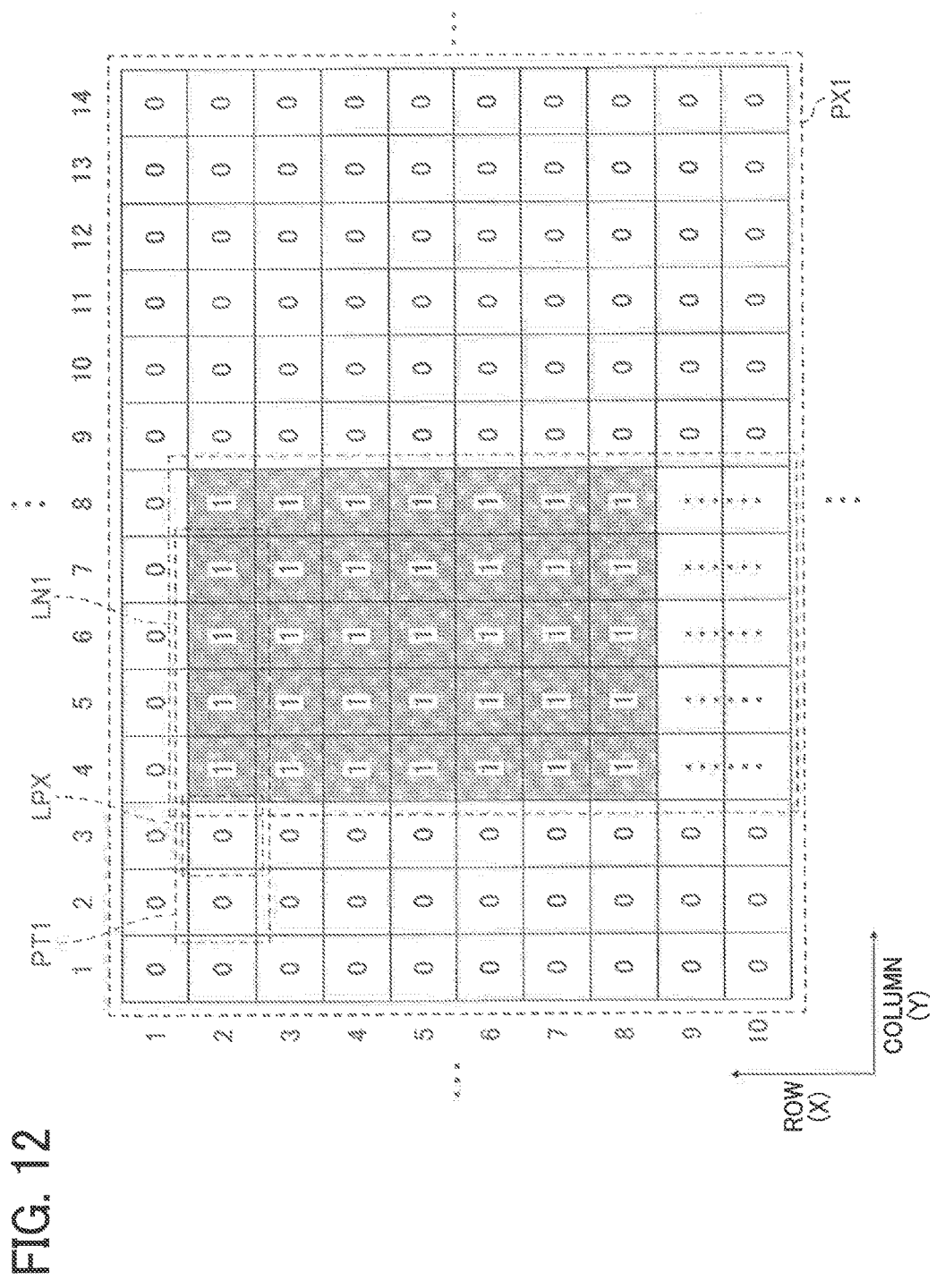

Referring now to FIG. 12, a description is given of identifying the pixel according to the specific data of FIG. 11A. FIG. 12 is a diagram illustrating an example of the pixel identified according to the specific data of FIG. 11A. FIG. 12 illustrates the first image data that includes first pixels PX1. Specifically, the first image data includes a plurality of pixels that forms a vertical line LN1 as an image. In the present example, the specific data illustrated in FIG. 11A matches e.g., a pattern of 6 pixels located in columns 2 through 7 in the second row (hereinafter referred to as a first specific pattern PT1) out of the first pixels PX1 in FIG. 12. The first specific pattern PT1 includes two consecutive pixels indicating "0" and four consecutive pixels indicating "1", in this order rightward in FIG. 12. That is, the specific data illustrated in FIG. 11A matches the first specific pattern PT1 in number of the pixels "0" and number of the pixels "1" and in location of the pixels "0" and location of the pixels "1". With the specific data thus set, a first target pixel is identified as a boundary that distinguishes between the plurality of pixels that forms the vertical line LN1 as an image and other pixels.

For example, in the first specific pattern PT1, the first target pixel is a left edge pixel LPX. The left edge pixel LPX is a boundary pixel that distinguishes between the pixel to turn on the light source 2200 and the pixel to turn off the light source 2200. That is, the left edge pixel LPX is adjacent to an edge of the vertical line LN1, and becomes a left edge portion of the vertical line LN1. In the present example of FIG. 12, the first target pixel indicates "0" and is adjacent to consecutive pixels "1".

With the specific data of FIG. 11A thus set, the image forming apparatus 2000 identifies the first target pixel out of the first pixels PX1 as illustrated in FIG. 12. Similarly, the image forming apparatus 2000 can identify the first target pixel by use of the specific data illustrated in FIGS. 11B through 11D.

For example, if the specific data illustrated in FIG. 11B is set, the image forming apparatus 2000 identifies a pixel as follows.

Figure 13:
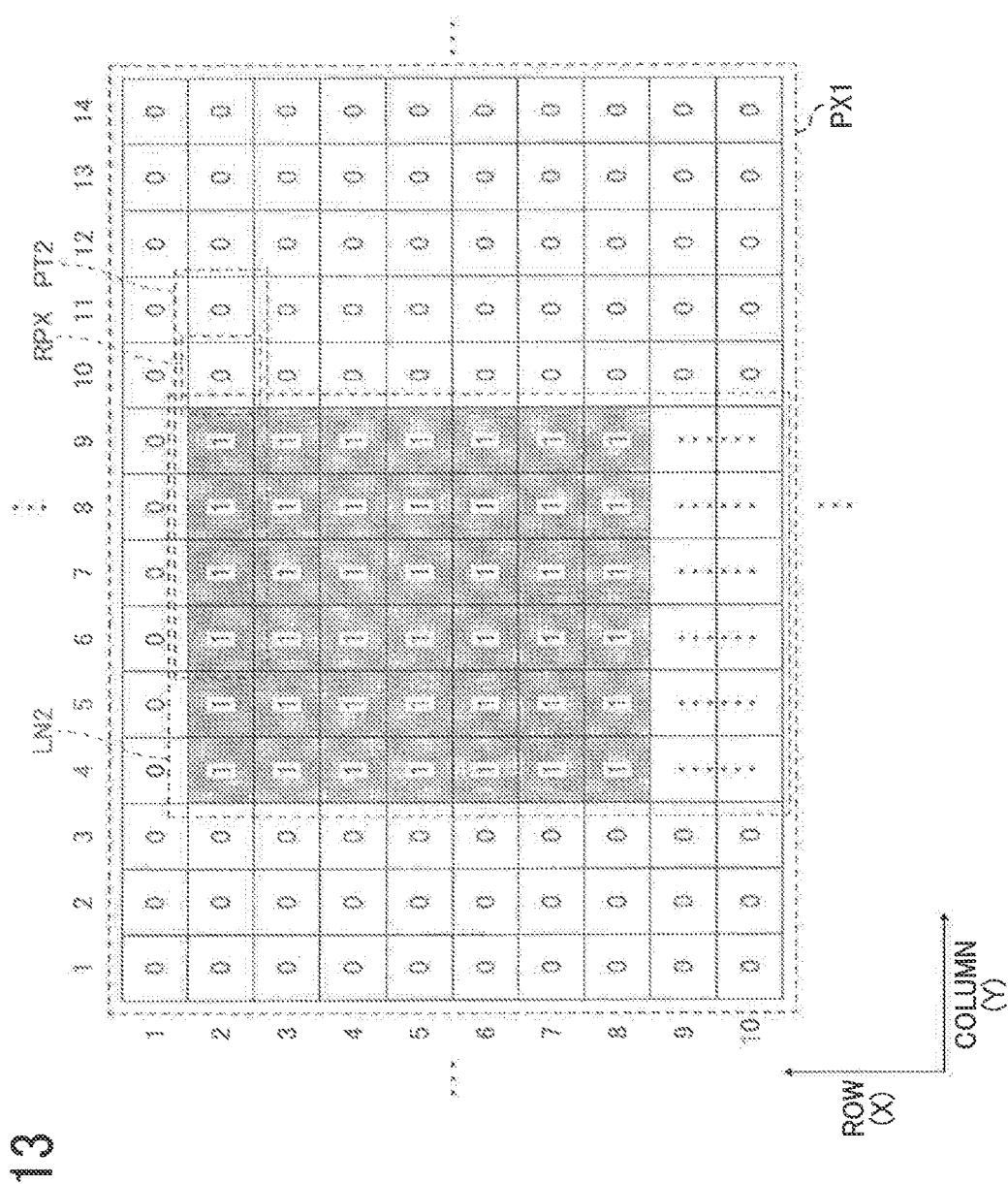
FIG. 13 is a diagram illustrating a pixel identified according to the specific data of FIG. 11B.

Referring now to FIG. 13, a description is given of identifying the pixel according to the specific data of FIG. 11B. FIG. 13 is a diagram illustrating an example of the pixel identified according to the specific data of FIG. 11B. FIG. 13 illustrates the first image data that includes the first pixels PX1. Specifically, the first image data includes a plurality of pixels that forms a vertical line LN2 as an image. In the present example, the specific data illustrated in FIG. 11B matches e.g., a pattern of 6 pixels located in columns 6 through 11 in the second row (hereinafter referred to as a second specific pattern PT2) out of the first pixels PX1 in FIG. 13. The second specific pattern PT2 includes four consecutive pixels indicating "1" and two consecutive pixels indicating "0", in this order rightward in FIG. 13. That is, the specific data illustrated in FIG. 11B matches the second specific pattern PT2 in number of the pixels "0" and number of the pixels "1" and in location of the pixels "0" and location of the pixels "1". With the specific data thus set, a first target pixel is identified as a boundary that distinguishes between the plurality of pixels that forms the vertical line LN2 as an image and other pixels.

For example, in the second specific pattern PT2, the first target pixel is a right edge pixel RPX. The right edge pixel RPX is a boundary pixel that distinguishes between the pixel to turn on the light source 2200 and the pixel to turn off the light source 2200. That is, the right edge pixel RPX is adjacent to an edge of the vertical line LN2, and becomes a right edge portion of the vertical line LN2. In the present example of FIG. 13, the first target pixel indicates "0" and is adjacent to consecutive pixels "1".

With the specific data of FIG. 11B thus set, the image forming apparatus 2000 identifies the first target pixel out of the first pixels PX1 as illustrated in FIG. 13.

If the specific data illustrated in FIG. 11C is set, the image forming apparatus 2000 identifies a pixel as follows.

Figure 14:
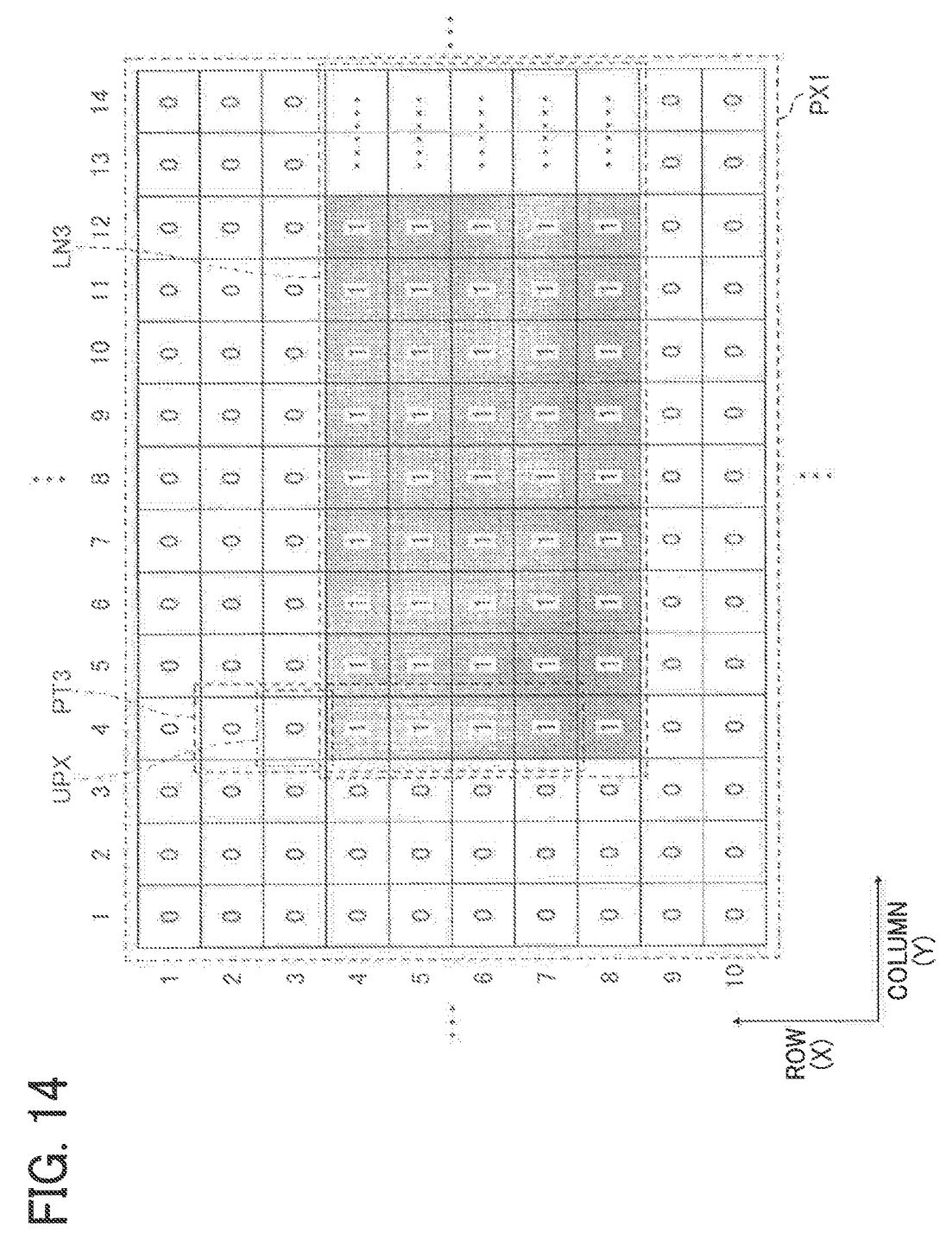

Referring now to FIG. 14, a description is given of identifying the pixel according to the specific data of FIG. 11C. FIG. 14 is a diagram illustrating an example of the pixel identified according to the specific data of FIG. 11C. FIG. 14 illustrates the first image data that includes the first pixels PX1. Specifically, the first image data includes a plurality of pixels that forms a lateral line LN3 as an image. In the present example, the specific data illustrated in FIG. 11C matches e.g., a pattern of 6 pixels located in rows 2 through 7 in the fourth column (hereinafter referred to as a third specific pattern PT3) out of the first pixels PX1 in FIG. 14. The third specific pattern PT3 includes two consecutive pixels indicating "0" and four consecutive pixels indicating "1", in this order downward in FIG. 14. That is, the specific data illustrated in FIG. 11C matches the third specific pattern PT3 in number of the pixels "0" and number of the pixels "1" and in location of the pixels "0" and location of the pixels "1". With the specific data thus set, a first target pixel is identified as a boundary that distinguishes between the plurality of pixels that forms the lateral line LN3 as an image and other pixels.

For example, in the third specific pattern PT3, the first target pixel is an upper edge pixel UPX. The upper edge pixel UPX is a boundary pixel that distinguishes between the pixel to turn on the light source 2200 and the pixel to turn off the light source 2200. That is, the upper edge pixel UPX is adjacent to an edge of the lateral line LN3, and becomes an upper edge portion of the lateral line LN3. In the present example of FIG. 14, the first target pixel indicates "0" and is adjacent to consecutive pixels "1".

With the specific data of FIG. 11C thus set, the image forming apparatus 2000 identifies the first target pixel out of the first pixels PX1 as illustrated in FIG. 14.

If the specific data illustrated in FIG. 11D is set, the image forming apparatus 2000 identifies a pixel as follows.

Figure 15:
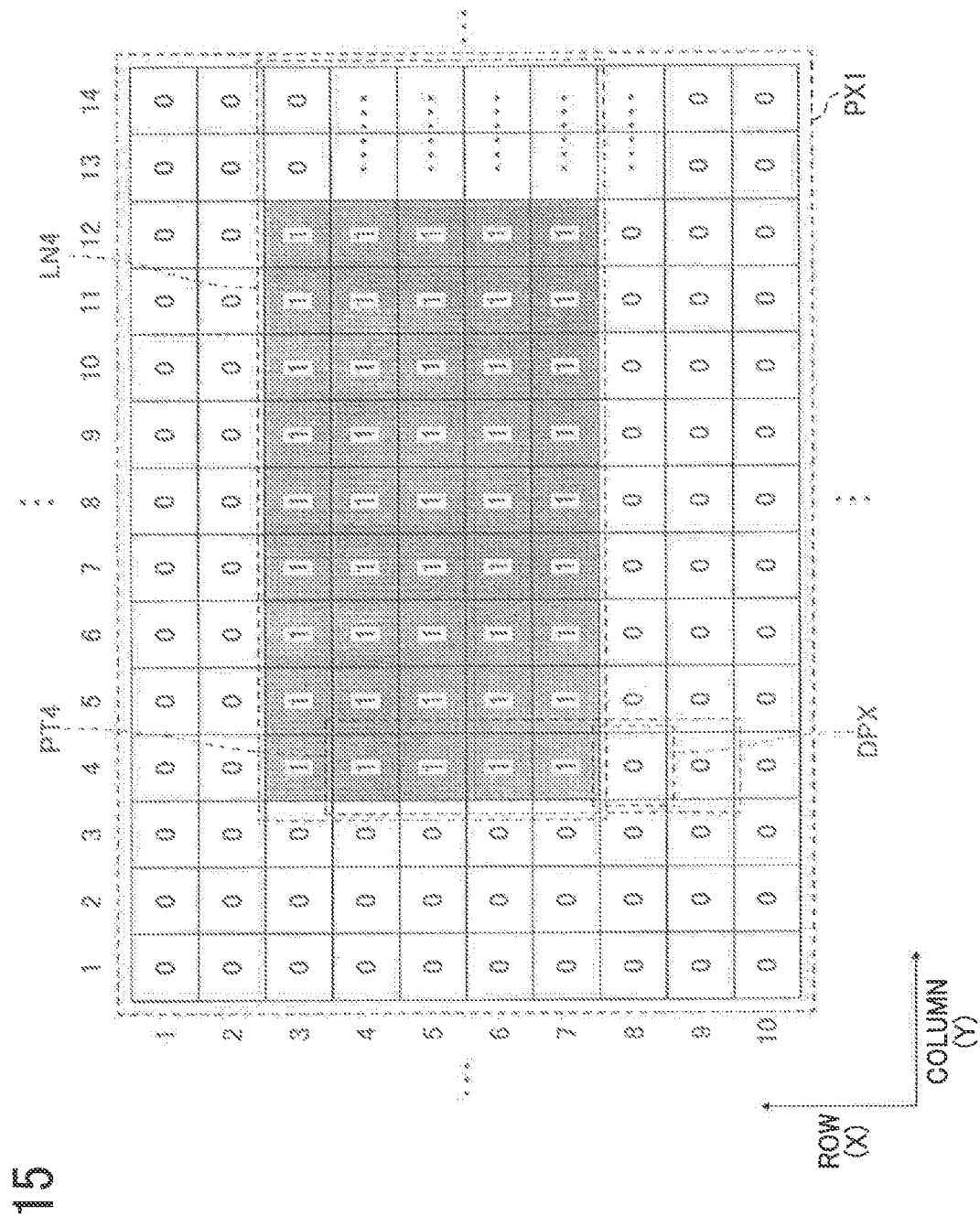
FIG. 15 is a diagram illustrating a pixel identified according to the specific data of FIG. 11D.

Referring now to FIG. 15, a description is given of identifying the pixel according to the specific data of FIG. 11D. FIG. 15 is a diagram illustrating an example of the pixel identified according to the specific data of FIG. 11D. FIG. 15 illustrates the first image data that includes the first pixels PX1. Specifically, the first image data includes a plurality of pixels that forms a lateral line LN4 as an image. In the present example, the specific data illustrated in FIG. 11D matches e.g., a pattern of 6 pixels located in rows 4 through 9 in the fourth column (hereinafter referred to as a fourth specific pattern PT4) out of the first pixels PX1 in FIG. 15. The fourth specific pattern PT4 includes four consecutive pixels indicating "1" and two consecutive pixels indicating "0", in this order downward in FIG. 15. That is, the specific data illustrated in FIG. 11D matches the fourth specific pattern PT4 in number of the pixels "0" and number of the pixels "1" and in location of the pixels "0" and location of the pixels "1". With the specific data thus set, a first target pixel is identified as a boundary that distinguishes between the plurality of pixels that forms the lateral line LN4 as an image and other pixels.

For example, in the fourth specific pattern PT4, the first target pixel is a down edge pixel DPX. The down edge pixel DPX is a boundary pixel that distinguishes between the pixel to turn on the light source 2200 and the pixel to turn off the light source 2200. That is, the down edge pixel DPX is adjacent to an edge of the lateral line LN4, and becomes a down edge portion of the lateral line LN4. In the present example of FIG. 15, the first target pixel indicates "0" and is adjacent to consecutive pixels "1".

With the specific data of FIG. 11D thus set, the image forming apparatus 2000 identifies the first target pixel out of the first pixels PX1 as illustrated in FIG. 15.

It is to be noted that the specific data is not limited to the four examples (i.e., patterns) illustrated in FIGS. 11A through 11D. For example, another type of specific data may be further set in the image forming apparatus 2000. For example, the image forming apparatus 2000 may be further given specific data that indicates a pattern with a number of pixels other than 6 or specific data having a ratio of 0 to 1 different from that of the specific data illustrated in FIGS. 11A through 11D.

Referring back to FIG. 10, a description is given of step S02, which is receiving a printing instruction.

In step S02, the image forming apparatus 2000 receives a printing instruction. For example, in the structure illustrated in FIG. 1, the upstream device 100 transmits, e.g., command data indicating the printing instruction and image data to the image forming apparatus 2000. Thus, the image forming apparatus 2000 receives the printing instruction through the command data and the like. In response to the printing instruction thus received, the image forming apparatus 2000 starts image processing according to the image data transmitted from the upstream device 100. In the structure illustrated in FIG. 1, the image forming apparatus 2000 starts image processing with the controller 2001 of FIG. 9.

Now, a description is given of step S03, which is generating tag data and performing image processing.

In step S03, the image forming apparatus 2000 generates tag data and performs image processing with the controller 2001. The tag data indicates a pixel attribute, which is an attribute of each pixel included in the image data. Specifically, for example, the pixel attribute is classified into, e.g., three categories: "image"; "text"; and "graphic". The pixel attribute depends on the type of an image to be formed by pixels input in image data by, e.g., a user operation. For example, the "text" is an attribute that indicates the pixel is a text or a line. More specifically, if the user inputs pixels in image data to form a text or a line, the pixel attribute is categorized as "text". By contrast, if the user inputs pixels in image data to form, e.g., a picture, the pixel attribute is categorized as "image".

The following will describe a subsequent process to form a text or a line. That is, the pixel attribute is "text". In the present example, the tag data is 1 bit data. Specifically, if the pixel has an attribute of "text", the tag data is "1". On the other hand, if the pixel has an attribute other than "text", the tag data is "0".

In step S03, the image forming apparatus 2000 performs image processing with the controller 2001 and the first plotter controller 2002, both illustrated in FIG. 9, to generate first image data. Then, the image forming apparatus 2000 transmits the first image data thus generated to, e.g., the second plotter controller 2003 illustrated in FIG. 9.

Now, a description is given of step S04, which is receiving the first image data and the tag data.

In step S04, the image forming apparatus 2000 receives the first image data and the tag data. For example, the image forming apparatus 2000 receives the first image data and the tag data as follows.

Figure 16:
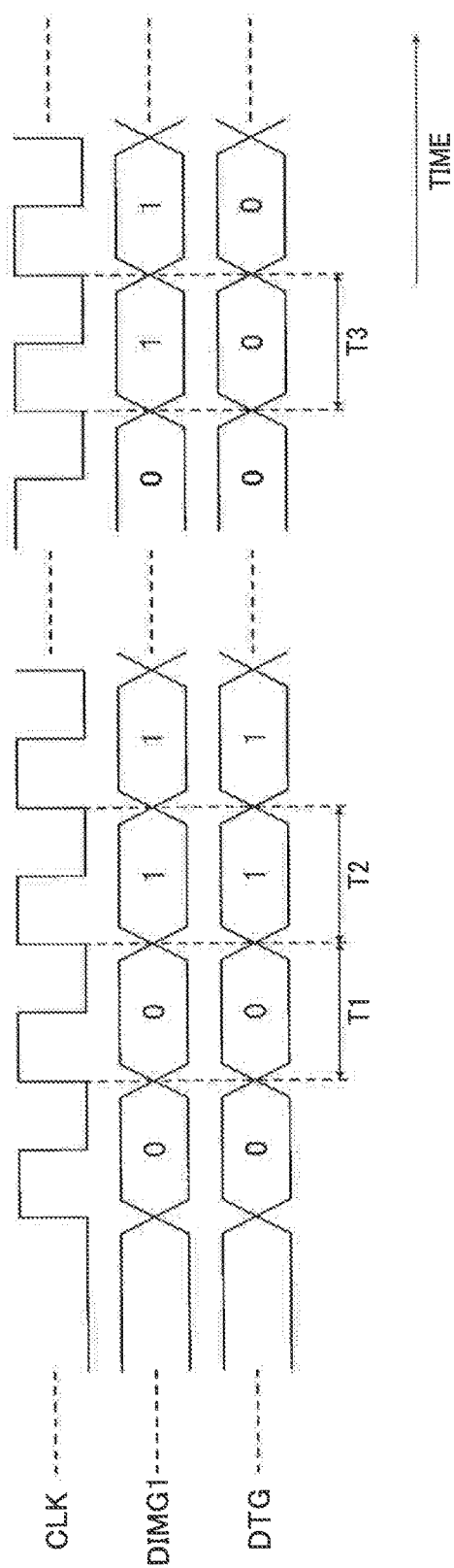
FIG. 16 is a timing chart illustrating an example of receiving first image data and tag data.

Referring now to FIG. 16, a description is given of receiving the first image data and the tag data. FIG. 16 is a timing chart illustrating an example of receiving the first image data and the tag data. For example, the image forming apparatus 2000 receives the first image data and the tag data through a signal synchronized with a clock signal CLK. In the present example of FIG. 16, each of first image data DIMG1 and tag data DTG is 1 bit data. One clock of the clock signal CLK corresponds to data of one pixel.

Specifically, for example, the first image data DIMG1 is "0" in a first timing T1. That is, the first image data DIMG1 indicates turning off the light source 2200 in the first timing T1. By contrast, in a second timing T2, the first image data DIMG1 is "1". That is, the first image data DIMG1 indicates turning on the light source 2200 in the second timing T2. On the other hand, in the second timing T2, the tag data DTG is "1". That is, the tag data DTG indicates that the first image data DIMG1 has an attribute of "text" in the second timing T2. Thus, the tag data DTG indicates the pixel attribute if the first image data DIMG1 is "1".

If the first image data DIMG1 is "1" and has an attribute other than "text", the tag data DTG is "0". For example, in a third timing T3, the first image data DIMG1 is "1" while the tag data DTG is "0". In this case, the image is, e.g., a picture.

Referring back to FIG. 10, a description is given of step S05, which is converting the first image data into second image data.

In step S05, the image forming apparatus 2000 converts the first image data into second image data. Specifically, first, the image forming apparatus 2000 identifies the first target pixel as illustrated in FIGS. 12 through 15 by, e.g., pattern matching, according to the specific data. Then, the image forming apparatus 2000 converts the first target pixel thus identified and the other first pixels as follows, for example.

Figure 17:
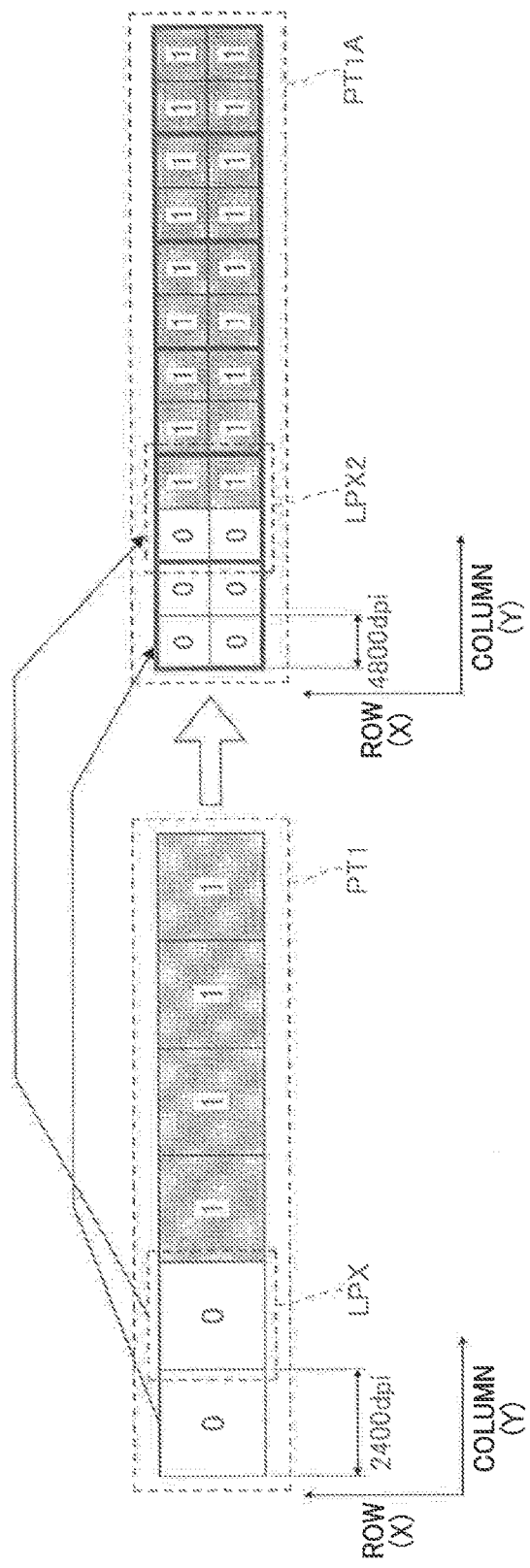
FIG. 17 is a diagram illustrating a first example of conversion.

Referring now to FIG. 17, a description is given of a first example of conversion. FIG. 17 is a diagram illustrating the first example of conversion. In the present example, the first pixels PX1 of the first specific pattern PT1 illustrated in FIG. 12 is converted into pixels of the second image data (hereinafter referred to as second pixels).

That is, as illustrated in FIG. 17, the first specific pattern PT1 is converted into a first converted pattern PT1A. Each of the first pixels of the first specific pattern PT1 is converted into four second pixels. The first target pixel identified in advance (i.e., left edge pixel LPX in the present example) is converted into four second pixels (hereinafter referred to as second target pixels LPX2) that correspond to the first target pixel. Specifically, two of the second target pixels LPX2 are pixels "1" each of which is adjacent to pixel "1". The other two of the second target pixels LPX2 are pixels "0". That is, half the four second target pixels LPX2 are pixels "1".

The second pixels other than the second target pixels LPX2 indicate values identical to the values indicated by the first pixels which the second pixels correspond to. Specifically, for example, if the first pixel indicates 0, all the four second pixels corresponding to the first pixel indicate "0". By contrast, if the first pixel indicates "1", all the four second pixels corresponding to the first pixel indicate "1".

If the left edge pixel LPX has an attribute of "text" according to the tag data, the conversion is performed as illustrated in FIG. 17. Specifically, if the left edge pixel LPX has an attribute indicated by the tag data "1" as in the second timing T2 of FIG. 16, then, a previous pixel immediately preceding the pixel accompanying the tag data "1" is the left edge pixel LPX. That is, the pixel in the first timing T1 is the left edge pixel LPX. As illustrated in FIG. 17, the image forming apparatus 2000 converts the left edge pixel LPX into the second target pixels LPX2. By contrast, if the left edge pixel LPX has an attribute other than "text", that is, if the left edge pixel LPX has an attribute indicated by the tag data "0" as in the third timing T3 of FIG. 16, then, the first pixel is converted into four second pixels, all of which indicate the value that is indicated by the first pixel, like the second pixels other than the second target pixels LPX2 illustrated in FIG. 17. That is, the first pixel is converted into four second pixels, all of which indicate identical values.

After the conversion as illustrated in FIG. 17, the line or text is formed thicker for one pixel in the column direction in the second image data having a resolution of 4800 dpi. Thus, the image forming apparatus 2000 converts the first image data into the second image data having a resolution higher than the resolution of the first image data. That is, the double-density processing of the first image data generates the second image data. When converting the first image data to generate the second image data, the image forming apparatus 2000 performs thickening processing to form a thicker line or text as an image.

Similarly, the first pixel identified in FIG. 13 is converted as follows, for example.

Figure 18:
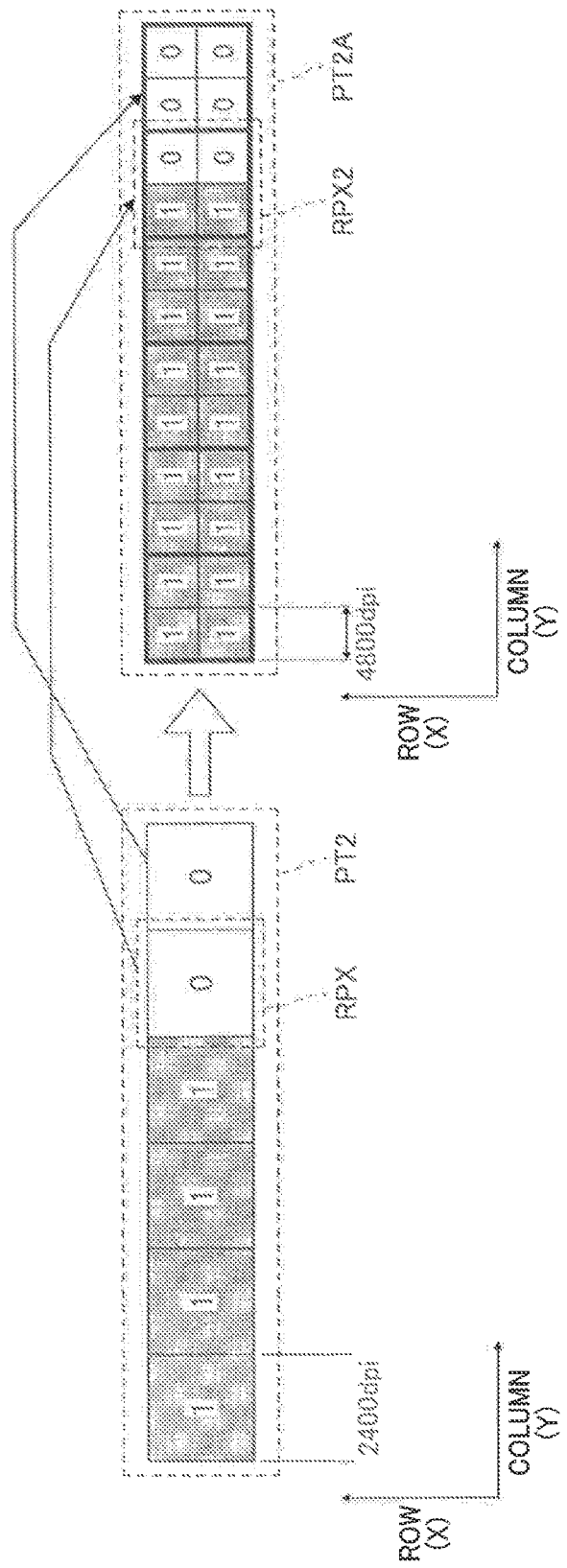
FIG. 18 is a diagram illustrating a second example of conversion.

Referring now to FIG. 18, a description is given of a second example of conversion. FIG. 18 is a diagram illustrating the second example of conversion. In the present example, the first pixels PX1 of the second specific pattern PT2 illustrated in FIG. 13 is converted into second pixels.

That is, as illustrated in FIG. 18, the second specific pattern PT2 is converted into a second converted pattern PT2A. Similar to FIG. 17, each of the first pixels of the second specific pattern PT2 is converted into four second pixels. The first target pixel identified in advance (i.e., right edge pixel RPX in the present example) is converted into four second pixels (hereinafter referred to as second target pixels RPX2) that correspond to the first target pixel. Specifically, two of the second target pixels RPX2 are pixels "1" each of which is adjacent to pixel "1". The other two of the second target pixels RPX2 are pixels "0". That is, similar to FIG. 17, half the four second target pixels RPX2 are pixels "1". What is converted into the second target pixels RPX2 is the right edge pixel RPX, which is a pixel immediately following a pixel accompanying the tag data "1".

After the conversion of the right edge pixel RPX as illustrated in FIG. 18, the line or text is formed thicker for one pixel in the column direction in the second image data having a resolution of 4800 dpi. Similar to FIG. 17, the image forming apparatus 2000 converts the first image data into the second image data having a resolution higher than the resolution of the first image data. That is, the double-density processing of the first image data generates the second image data. When converting the first image data to generate the second image data, the image forming apparatus 2000 performs thickening processing to form a thicker line or text as an image.

Similarly, the first pixel identified in FIG. 14 is converted as follows, for example.

Figure 19:
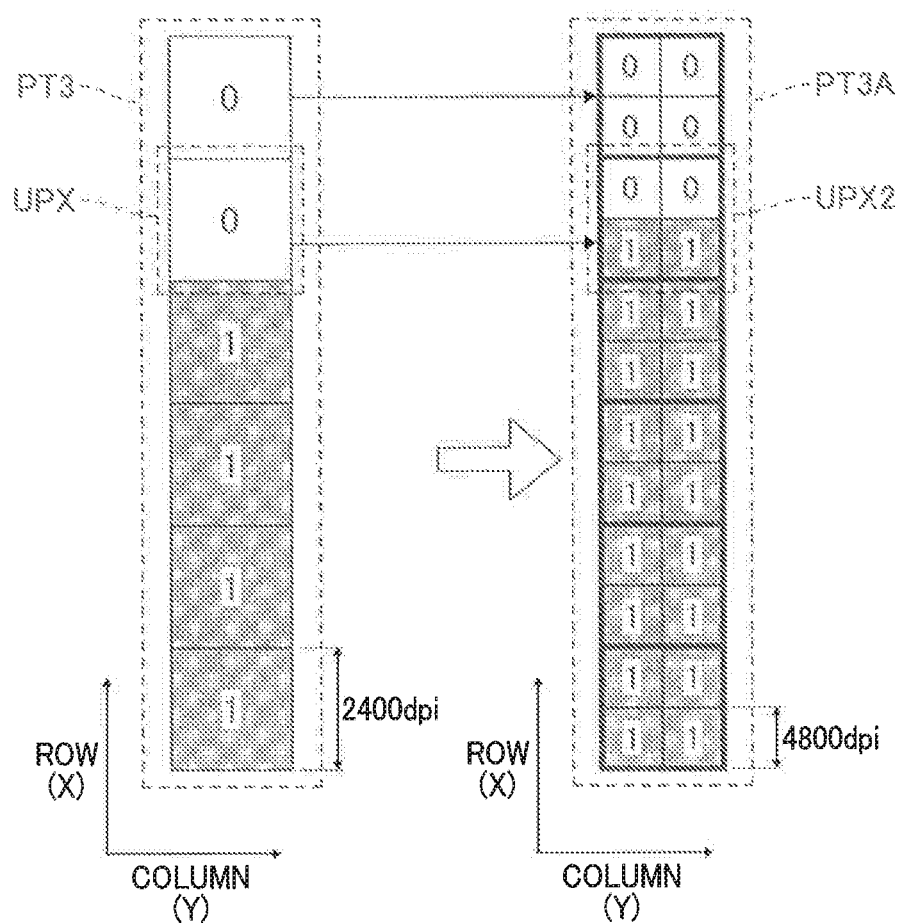
FIG. 19 is a diagram illustrating a third example of conversion.

Referring now to FIG. 19, a description is given of a third example of conversion. FIG. 19 is a diagram illustrating the third example of conversion. In the present example, the first pixels PX1 of the third specific pattern PT3 illustrated in FIG. 14 is converted into second pixels.

That is, as illustrated in FIG. 19, the third specific pattern PT3 is converted into a third converted pattern PT3A. Similar to FIG. 17, each of the first pixels of the third specific pattern PT3 is converted into four second pixels. The first target pixel identified in advance (i.e., upper edge pixel UPX in the present example) is converted into four second pixels (hereinafter referred to as second target pixels UPX2) that correspond to the first target pixel. Specifically, two of the second target pixels UPX2 are pixels "1" each of which is adjacent to pixel "1". The other two of the second target pixels UPX2 are pixels "0". That is, similar to FIG. 17, half the four second target pixels RPX2 are pixels "1". What is converted into the second target pixels UPX2 is the upper edge pixel UPX, which is a pixel immediately up from a pixel accompanying the tag data "1".

After the conversion of the upper edge pixel UPX as illustrated in FIG. 19, the line or text is formed thicker for one pixel in the row direction in the second image data having a resolution of 4800 dpi. Similar to FIG. 17, the image forming apparatus 2000 converts the first image data into the second image data having a resolution higher than the resolution of the first image data. That is, the double-density processing of the first image data generates the second image data. When converting the first image data to generate the second image data, the image forming apparatus 2000 performs thickening processing to form a thicker line or text as an image.

Similarly, the first pixel identified in FIG. 15 is converted as follows, for example.

Figure 20:
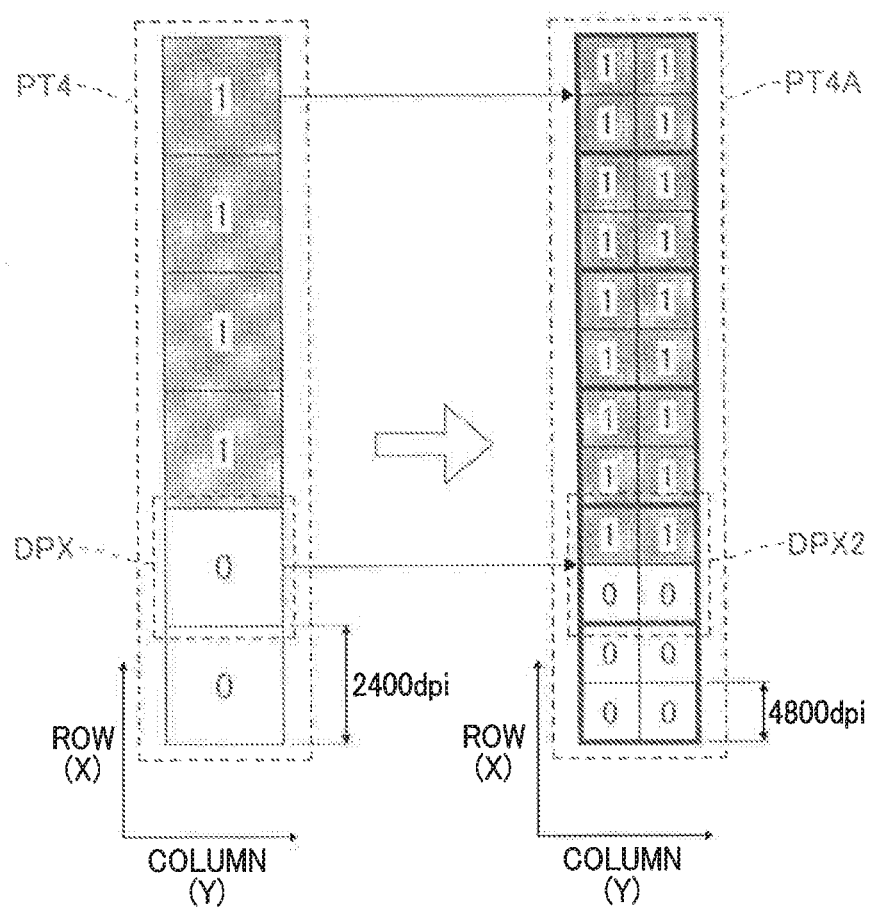
FIG. 20 is a diagram illustrating a fourth example of conversion.

Referring now to FIG. 20, a description is given of a fourth example of conversion. FIG. 20 is a diagram illustrating the fourth example of conversion. In the present example, the first pixels PX1 of the fourth specific pattern PT4 illustrated in FIG. 15 is converted into second pixels.

That is, as illustrated in FIG. 20, the fourth specific pattern PT4 is converted into a fourth converted pattern PT4A. Similar to FIG. 17, each of the first pixels of the fourth specific pattern PT4 is converted into four second pixels. The first target pixel identified in advance (i.e., down edge pixel DPX in the present example) is converted into four second pixels (hereinafter referred to as second target pixels DPX2) that correspond to the first target pixel. Specifically, two of the second target pixels DPX2 are pixels "1" each of which is adjacent to pixel "1". The other two of the second target pixels DPX2 are pixels "0". That is, similar to FIG. 17, half the four second target pixels DPX2 are pixels "1". What is converted into the second target pixels DPX2 is the down edge pixel DPX, which is a pixel immediately down from a pixel accompanying the tag data "1".

After the conversion of the down edge pixel DPX as illustrated in FIG. 20, the line or text is formed thicker for one pixel in the row direction in the second image data having a resolution of 4800 dpi. Similar to FIG. 17, the image forming apparatus 2000 converts the first image data into the second image data having a resolution higher than the resolution of the first image data. That is, the double-density processing of the first image data generates the second image data. When converting the first image data to generate the second image data, the image forming apparatus 2000 performs thickening processing to form a thicker line or text as an image.

It is to be noted that the thickening processing performed in the conversion is not limited to forming a line or a text thicker for one pixel as illustrated in FIGS. 17 through 20. Alternatively, the image forming apparatus 2000 may perform the thickening processing to form a line or a text thicker for two or more pixels. A user, for example, may give the image forming apparatus 2000 the information on the thickness of the line or text to be formed.

Referring now to FIGS. 21A through 25B, a description is given of examples of double-density processing, which is an example of the conversion performed by the image forming apparatus 2000.

Figure 21A:
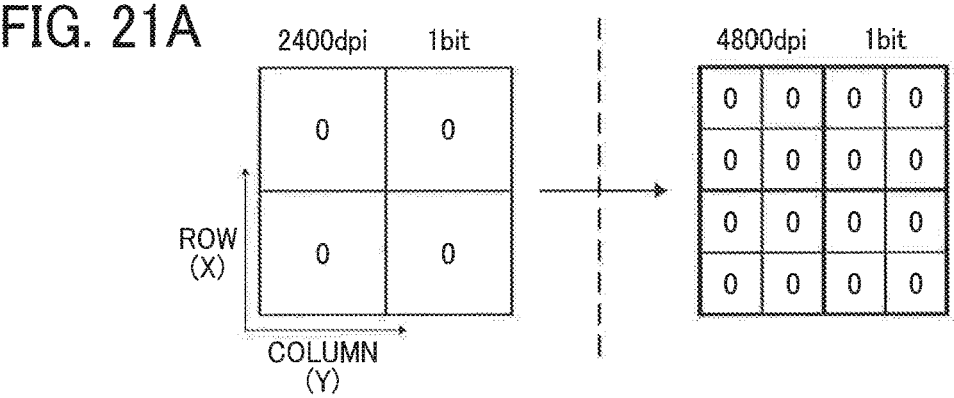
FIG. 21A is a diagram illustrating a first case of a first example of double-density processing performed by the image forming apparatus of FIG. 1.
Figure 21B:
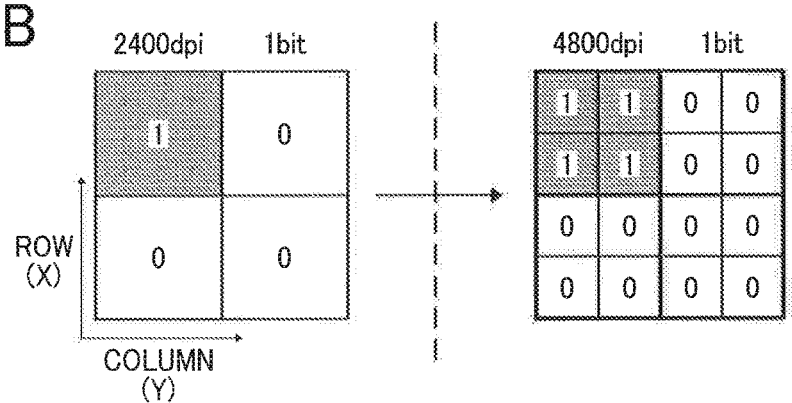
FIG. 21B is a diagram illustrating a second case of the first example of double-density processing performed by the image forming apparatus of FIG. 1.
Figure 21C:
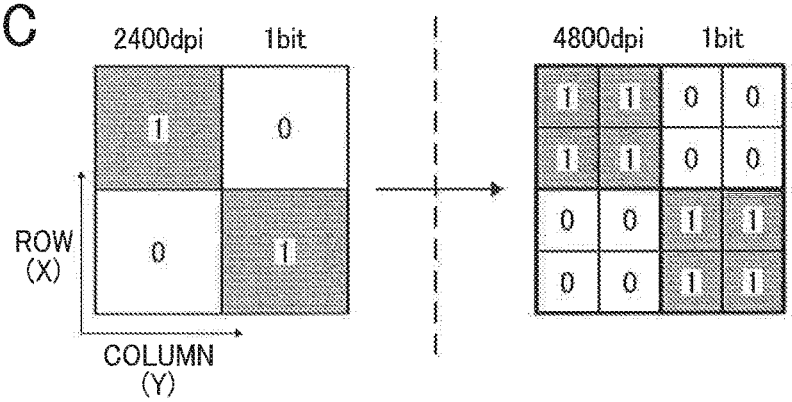
FIG. 21C is a diagram illustrating a third case of the first example of double-density processing performed by the image forming apparatus of FIG. 1.
Figure 21D:
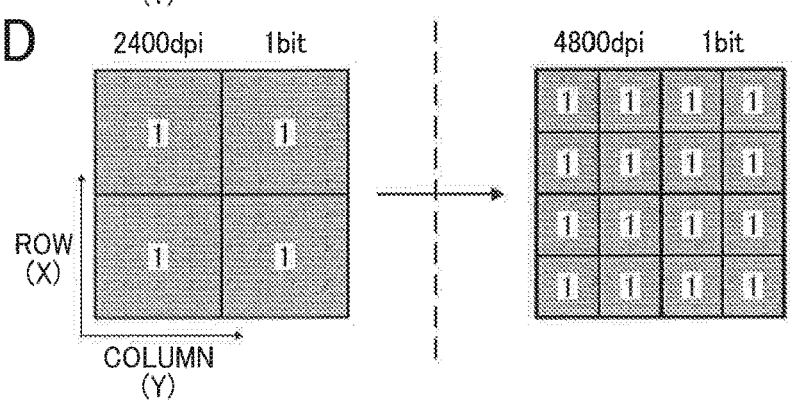
FIG. 21D is a diagram illustrating a fourth case of the first example of double-density processing performed by the image forming apparatus of FIG. 1.

Initially with reference to FIGS. 21A through 21D, a description is given of a first example of the double-density processing performed by the image forming apparatus 2000. FIG. 21A is a diagram illustrating a first case of the first example of the double-density processing. FIG. 21B is a diagram illustrating a second case of the first example of the double-density processing. FIG. 21C is a diagram illustrating a third case of the first example of the double-density processing. FIG. 21D is a diagram illustrating a fourth case of the first example of the double-density processing. For example, the first image data has a resolution of 2400 dpi. Each pixel of the first image data is 1 bit data indicating turning on or turning off the light source 2200. The first image data is converted into the second image data as illustrated in FIGS. 21A through 21D. Thus, the second data having a resolution of 4800 dpi is generated. Each pixel of the second image data is 1 bit data. The present example is an example of conversion performed when the first image data does not include the first target pixel, which is an edge pixel as illustrated in FIGS. 12 through 15 while having an attribute of "text".

The resolution of the first image data subjected to conversion is not limited to 2400 dpi. Alternatively, for example, the resolution of the first image data may be 600 dpi or lower.

Each pixel of the first image data is not limited to 1 bit data. Alternatively, each pixel of the first image data may be two or more bit data. For example, if the pixels of the first image data are 2 bit data, that is, if the first pixels are 2 bit data, the following conversion may be performed.

Figure 22C:
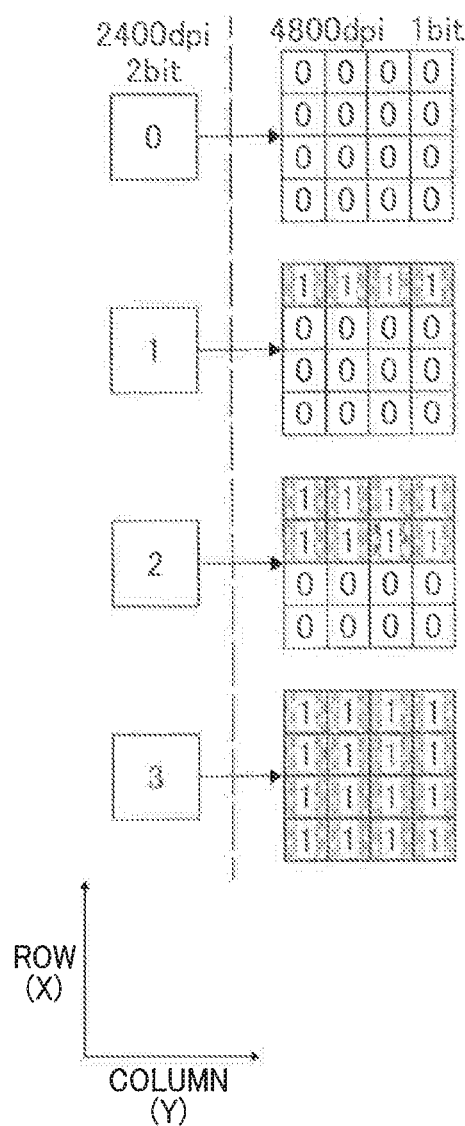
FIG. 22C is a diagram illustrating a third case of the second example of double-density processing performed by the image forming apparatus of FIG. 1.
Figure 22D:
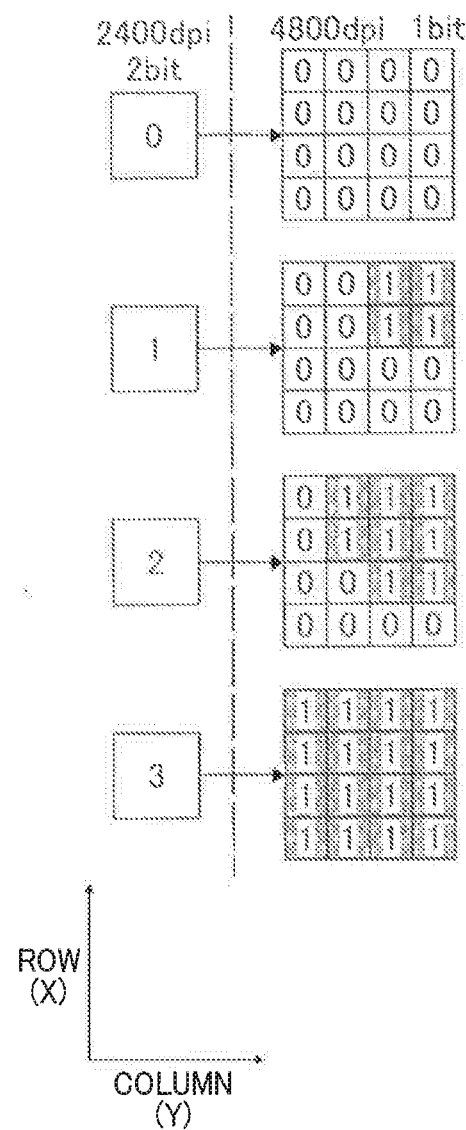
FIG. 22D is a diagram illustrating a fourth case of the second example of double-density processing performed by the image forming apparatus of FIG. 1.

Referring now to FIGS. 22A through 22D, a description is given of a second example of the double-density processing performed by the image forming apparatus 2000. FIG. 22A is a diagram illustrating a first case of the second example of the double-density processing. FIG. 22B is a diagram illustrating a second case of the second example of the double-density processing. FIG. 22C is a diagram illustrating a third case of the second example of the double-density processing. FIG. 22D is a diagram illustrating a fourth case of the second example of the double-density processing. In the present example, the first pixels are 2 bit data. That is, each of the first pixels indicates one of values from zero to three. It is to be noted that the first pixel "0" indicates that an image is not formed. The first pixel of a greater value indicates that an image is formed with higher density. In the present example, the image forming apparatus 2000 is set in advance so as to perform conversion of any one of the combinations illustrated in FIGS. 22A through 22D.

The present example includes top alignment. Specifically, in the top alignment, the second pixels "1" generated from the first pixel "1" or from the first pixel "2" are gathered upward. Further, FIG. 22A illustrates the second pixels "1" gathered leftward. FIGS. 22B and 22C illustrate the second pixels "1" gathered in the center. FIG. 22D illustrates the second pixels "1" gathered rightward.

Alternatively, the following conversion may be performed if the first pixels are 2 bit data.

Figure 23A:
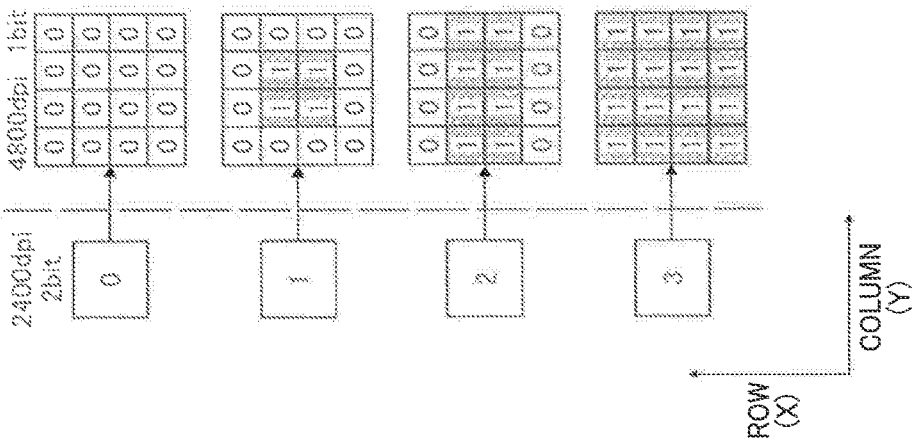
FIG. 23A is a diagram illustrating a first case of a third example of double-density processing performed by the image forming apparatus of FIG. 1.
Figure 23B:
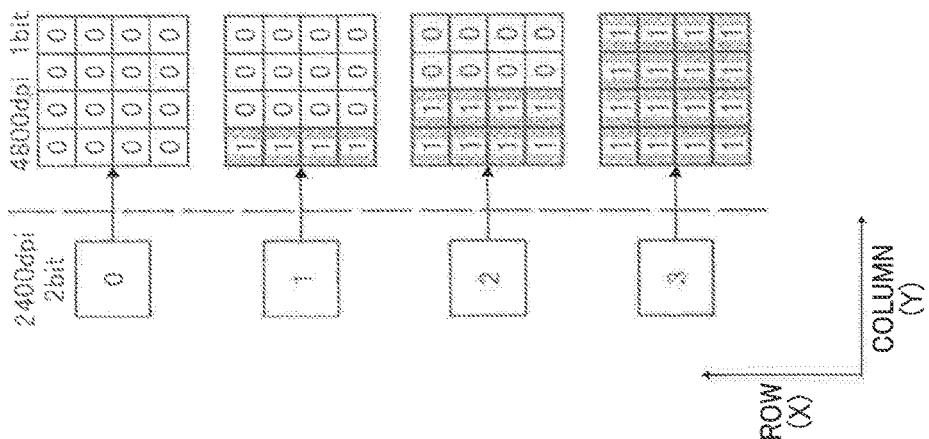
FIG. 23B is a diagram illustrating a second case of the third example of double-density processing performed by the image forming apparatus of FIG. 1.
Figure 23C:
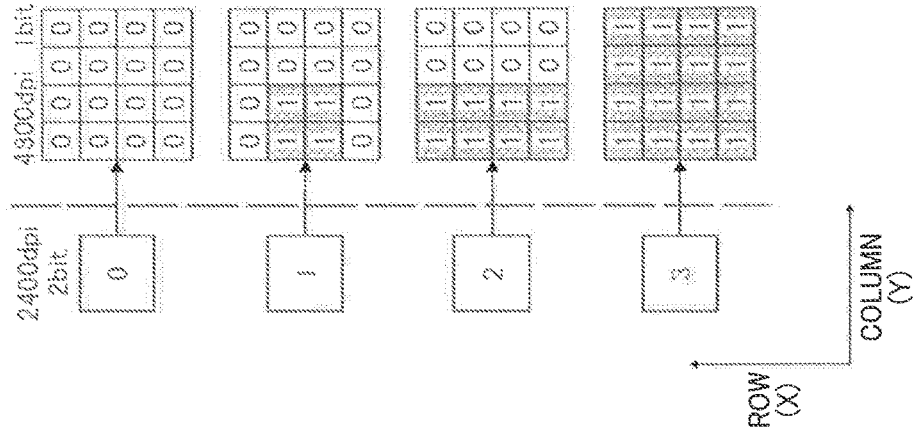
FIG. 23C is a diagram illustrating a third case of the third example of double-density processing performed by the image forming apparatus of FIG. 1.
Figure 23D:
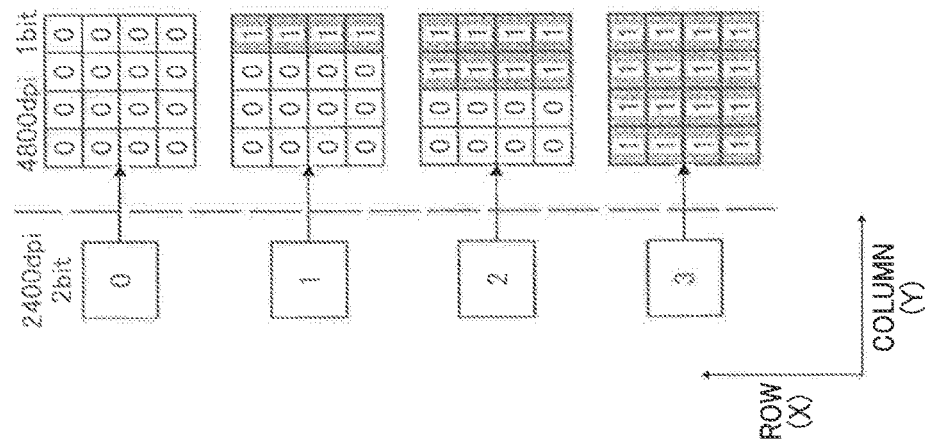
FIG. 23D is a diagram illustrating a fourth case of the third example of double-density processing performed by the image forming apparatus of FIG. 1.
Figure 23E:
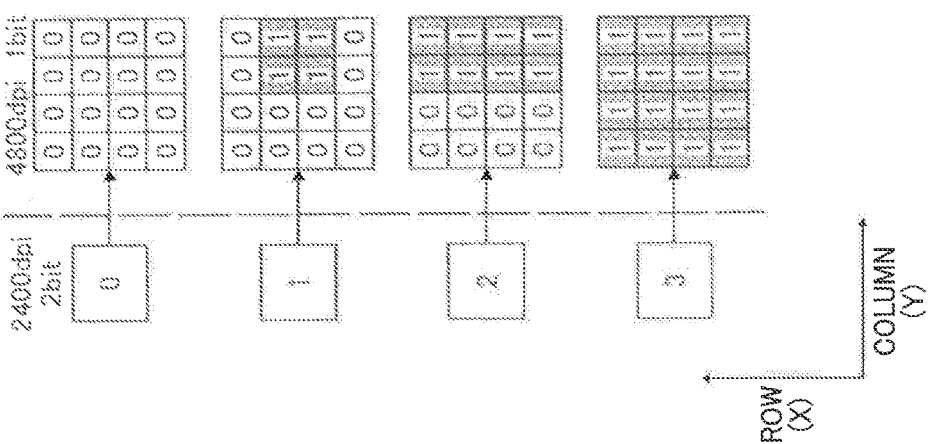
FIG. 23E is a diagram illustrating a fifth case of the third example of double-density processing performed by the image forming apparatus of FIG. 1.
Figure 23F:
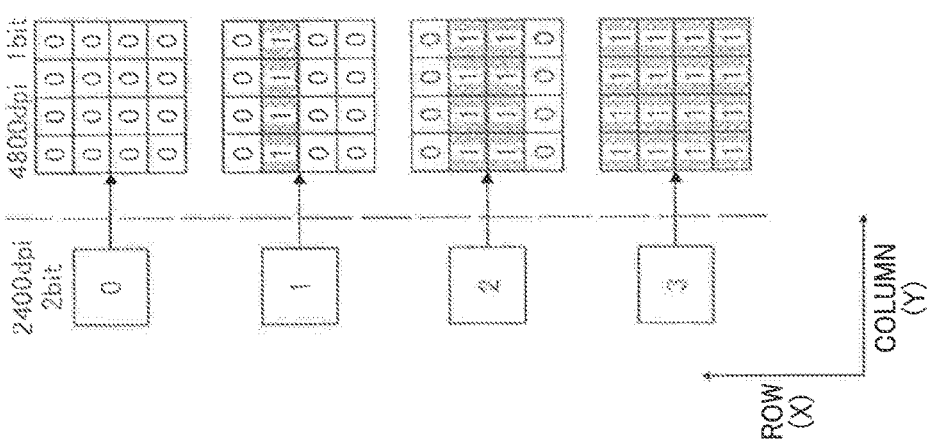
FIG. 23F is a diagram illustrating a sixth case of the third example of double-density processing performed by the image forming apparatus of FIG. 1.

Referring now to FIGS. 23A through 23F, a description is given of a third example of the double-density processing performed by the image forming apparatus 2000. FIG. 23A is a diagram illustrating a first case of the third example of the double-density processing. FIG. 23B is a diagram illustrating a second case of the third example of the double-density processing. FIG. 23C is a diagram illustrating a third case of the third example of the double-density processing. FIG. 23D is a diagram illustrating a fourth case of the third example of the double-density processing. FIG. 23E is a diagram illustrating a fifth case of the third example of the double-density processing. FIG. 23F is a diagram illustrating a sixth case of the third example of the double-density processing. In the present example, similar to FIGS. 22A through 22D, the first pixels are 2 bit data. That is, each of the first pixels indicates one of values from zero to three. In the present example, the image forming apparatus 2000 is set in advance so as to perform conversion of any one of the combinations illustrated in FIGS. 23A through 23F.

Compared to FIGS. 22A through 22D, FIGS. 23A through 23F illustrate identical conversion with respect to the first pixel "1" or the first pixel "3". The present example of FIG. 23 includes center alignment in which the pixels "1" are gathered in the center in the row direction.

The first pixels may be two or more bit data (hereinafter referred to as multi-bit data). If the first pixels are multi-bit data, location of the second pixels that indicate turning on the light sources 2200 is determined according to the value indicated by the first pixel. For example, if the first pixels are 2 bit data (i.e., multi-bit data), the following conversion may be performed.

Figure 24C:
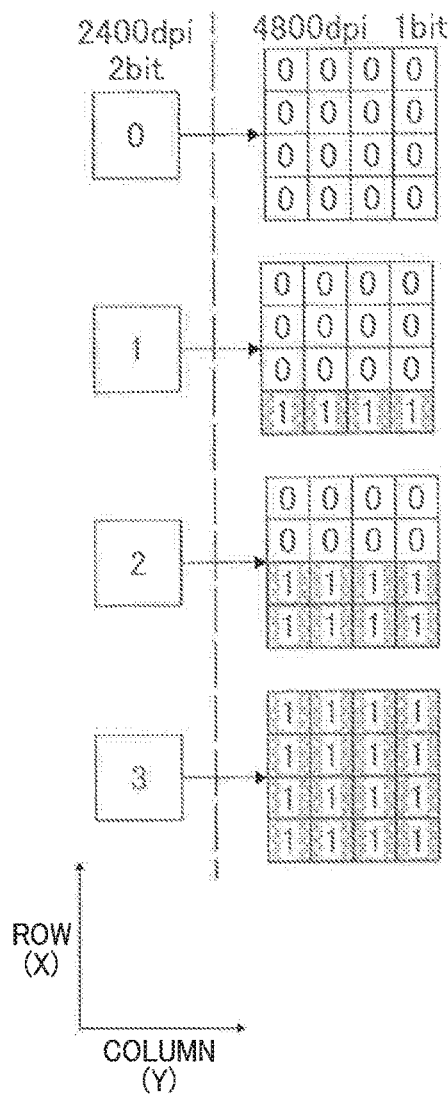
FIG. 24C is a diagram illustrating a third case of the fourth example of double-density processing performed by the image forming apparatus of FIG. 1.

Referring now to FIGS. 24A through 24D, a description is given of a fourth example of the double-density processing performed by the image forming apparatus 2000. FIG. 24A is a diagram illustrating a first case of the fourth example of the double-density processing. FIG. 22B is a diagram illustrating a second case of the fourth example of the double-density processing. FIG. 22C is a diagram illustrating a third case of the fourth example of the double-density processing. FIG. 22D is a diagram illustrating a fourth case of the fourth example of the double-density processing. In the present example, similar to FIGS. 22A through 22D, the first pixels are 2 bit data. That is, each of the first pixels indicates one of values from zero to three. In the present example, the image forming apparatus 2000 is set in advance so as to perform conversion of any one of the combinations illustrated in FIGS. 24A through 24F.

Compared to FIGS. 22A through 22D, FIGS. 24A through 24D illustrate identical conversion with respect to the first pixel "1" or the first pixel "3". The present example of FIG. 24A through 24D includes bottom alignment.

Figure 24D:
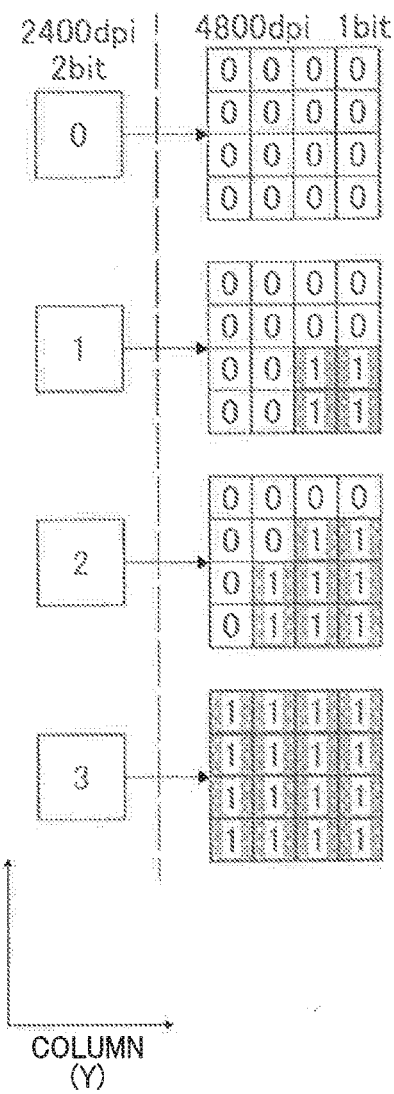
FIG. 24D is a diagram illustrating a fourth case of the fourth example of double-density processing performed by the image forming apparatus of FIG. 1.

Specifically, in the bottom alignment, the second pixels "1" generated from the first pixel "1" or from the first pixel "2" are gathered downward. Further, FIG. 24A illustrates the second pixels "1" gathered leftward. FIGS. 24B and 24C illustrate the second pixels "1" gathered in the center. FIG. 24D illustrates the second pixels "1" gathered rightward.

Alternatively, the following conversion may be performed if the first pixels are 2 bit data.

Referring now to FIGS. 25A and 25B, a description is given of a fifth example of the double-density processing performed by the image forming apparatus 2000. FIG. 25A is a diagram illustrating a first case of the fifth example of the double-density processing. FIG. 25B is a diagram illustrating a second case of the fifth example of the double-density processing. In the present example, similar to FIGS. 22A through 22D, the first pixels are 2 bit data. That is, each of the first pixels indicates one of values from zero to three. In the present example, the image forming apparatus 2000 is set in advance so as to perform conversion of either one of the combinations illustrated in FIGS. 25A and 25B.

Unlike the conversion illustrated in FIGS. 22A through 24D, the conversion illustrated in FIGS. 25A and 25B does not include top, center, or bottom alignment. Instead, the second pixels "1" are aligned relatively uniformly. Compared to FIGS. 22A through 22D, FIGS. 25A and 25B illustrate identical conversion with respect to the first pixel "1" or the first pixel "3".

FIGS. 26A through 26C illustrate a comparative example of double-density processing performed by an image forming apparatus. In the comparative example, an image is formed as illustrated in FIG. 26A. As illustrated in FIG. 26B, according to the image data, control is performed to turn on a light source in an eleventh timing T11 and to turn off the light source in a twelfth timing T12 corresponding to a next pixel. In FIGS. 26B and 26C, "H" represents turning on the light source while "L" represents turning off the light source. In such a case, depending on the response speed of the light source, the control of the light source may fail to switch between turning on and off the light source in time. Hence, in the image forming apparatus 2000, the image data illustrated in FIG. 26A is converted as follows.

FIGS. 27A through 27C illustrate an example of results of the double-density processing performed by the image forming apparatus 2000. Image data illustrated in FIG. 27A is generated by conversion of, e.g., FIG. 23E or FIG. 23F. Compared to FIGS. 26A through 26C, the light source 2200 is not switched between turning on and off in the twelfth timing T12 and a thirteenth timing T13. That is, once the light source 2200 is turned on, activation of the light source 2200 is maintained. The present example suppresses formation of an undesired image that may be caused by delay in response from the light source to switch between turning on and off as illustrated in FIG. 26C.

In some embodiments, both the first and second pixels may be multi-bit data. For example, both the first and second pixels may be 4 bit data indicating hexadecimal numerals zero to nine and A to F that represent values ten to fifteen. In such a case, the following conversion may be performed.

Figure 28:
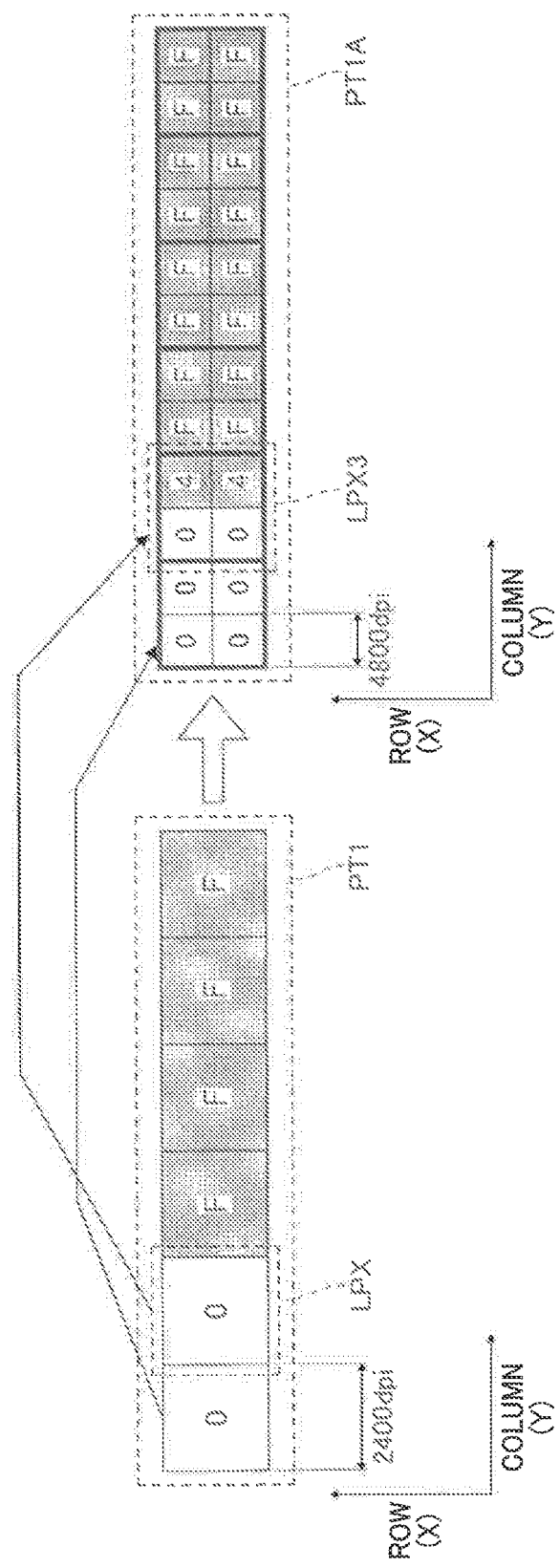
FIG. 28 is a diagram illustrating a first example of conversion of multi-bit data.
Figure 29:
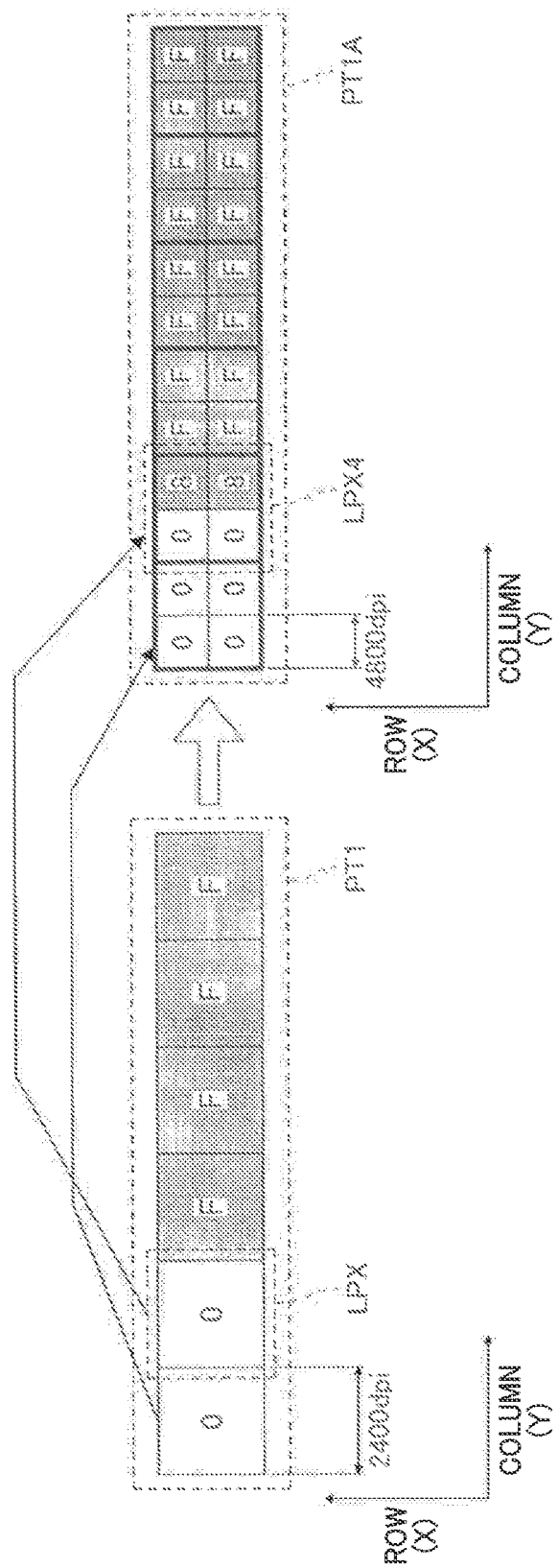
FIG. 29 is a diagram illustrating a second example of conversion of multi-bit data.
Figure 30:
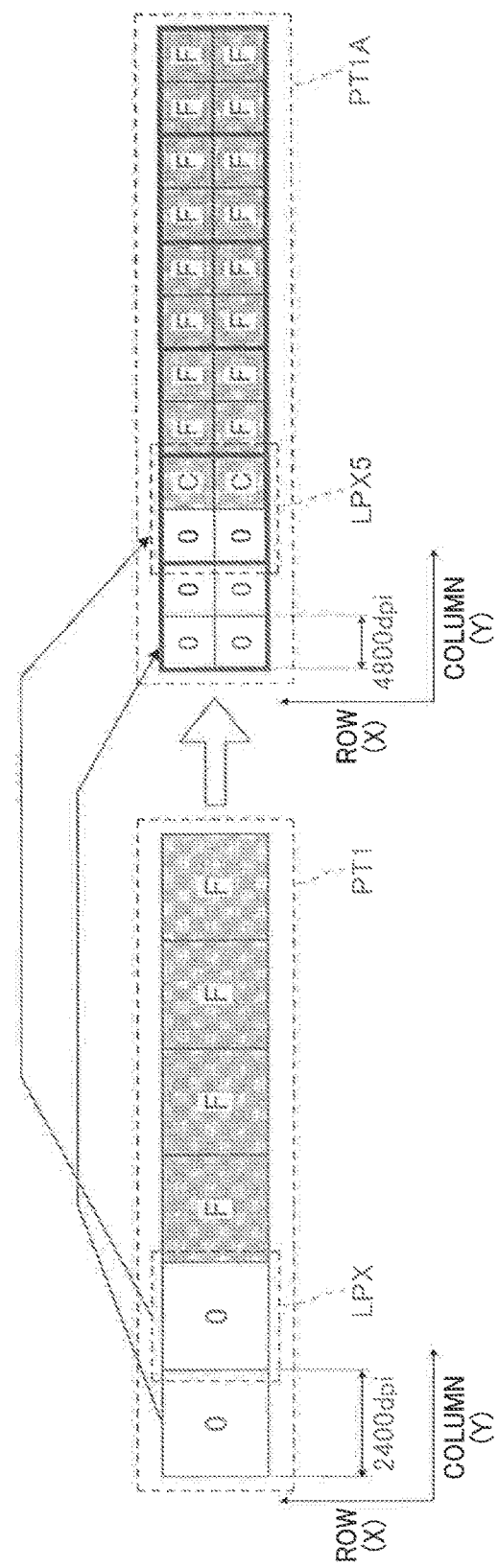
FIG. 30 is a diagram illustrating a third example of conversion of multi-bit data.

Referring now to FIGS. 28 through 30, a description is given of converting multi-bit data. FIG. 28 is a diagram illustrating a first example of conversion of multi-bit data. If the pixels illustrated in FIG. 17 are multi-bit data, the pixels are converted as illustrated in FIG. 28. It is to be noted that the value of each pixel represents image density, that is, density of an image to be formed. In the present example, "0" indicates white. The greater the value is, the higher the density is. That is, a greater value indicates a color closer to black. Specifically, the density or the value indicates, e.g., a duty cycle of a control signal to turn on the light source 2200 or a duration of turning on the light source 2200. It is to be noted that the control signal is, e.g., a pulse-width modulation (PWM) signal.

Compared to FIG. 17, the pixels used are multi-bit data. That is, FIG. 28 is different from FIG. 17 in that the pixels of FIG. 28 are multi-bit data. As illustrated in FIG. 28, the first specific pattern PT1 includes the left edge pixel LPX. The processing performed in a case other than the case in which the left edge pixel LPX has an attribute of "text" is similar to that of FIG. 17.

In the present example, the first specific pattern PT1 is converted into the first converted pattern PT1A. Each of the first pixels of the first specific pattern PT1 is converted into four second pixels by the double-density processing. The first target pixel identified in advance (i.e., left edge pixel LPX in the present example) is converted into four second pixels (hereinafter referred to as second target pixels LPX3) that correspond to the first target pixel. Specifically, two of the second target pixels LPX3 are pixels "4" each of which is adjacent to pixel "F". The other two of the second target pixels LPX3 are pixels "0". That is, half the four second target pixels LPX3 are pixels "4".

The second pixels other than the second target pixels LPX3 indicate values identical to the values indicated by the first pixels which the second pixels correspond to. Specifically, for example, if the first pixel indicates 0, all the four second pixels corresponding to the first pixel indicate "0". By contrast, if the first pixel indicates "F", all the four second pixels corresponding to the first pixel indicate "F".

If the left edge pixel LPX has an attribute of "text" according to the tag data, the conversion is performed as illustrated in FIG. 28. Specifically, if the left edge pixel LPX has an attribute indicated by the tag data "1" as in the second timing T2 of FIG. 16, the image forming apparatus 2000 converts the left edge pixel LPX into the second target pixels LPX3. By contrast, if the left edge pixel LPX has an attribute other than "text", that is, if the left edge pixel LPX has an attribute indicated by the tag data "0" as in the third timing T3 of FIG. 16, then, the first pixel is converted into four second pixels, all of which indicate the value that is indicated by the first pixel, like the second pixels other than the second target pixels LPX3 illustrated in FIG. 28. That is, the first pixel is converted into four second pixels, all of which indicate identical values.

After the conversion as illustrated in FIG. 28, the line or text is formed thicker for one pixel in the column direction in the second image data having a resolution of 4800 dpi. Thus, the image forming apparatus 2000 converts the first image data into the second image data having a resolution higher than the resolution of the first image data. That is, the double-density processing of the first image data generates the second image data. When converting the first image data to generate the second image data, the image forming apparatus 2000 performs thickening processing to form a thicker line or text as an image.

As described above, in the present example, the first target pixel is converted such that half the four second target pixels are pixels "4". Alternatively, the first target pixel may be converted such that half the four second target pixels indicate a value other than "4".

FIG. 29 is a diagram illustrating a second example of conversion of multi-bit data. Compared to FIG. 28 in which the first pixel is converted to generate the second pixels "4", the first pixel is converted to generate second pixels "8" in FIG. 29. Specifically, the first target pixel identified in advance (i.e., left edge pixel LPX in the present example) is converted into four second pixels (hereinafter referred to as second target pixels LPX4) that correspond to the first target pixel. Two of the second target pixels LPX4 are pixels "8" each of which is adjacent to pixel "F".

FIG. 30 is a diagram illustrating a third example of conversion of multi-bit data. Compared to FIG. 28 in which the first pixel is converted to generate the second pixels "4", the first pixel is converted to generate second pixels "C" in FIG. 30. Specifically, the first target pixel identified in advance (i.e., left edge pixel LPX in the present example) is converted into four second pixels (hereinafter referred to as second target pixels LPX5) that correspond to the first target pixel. Two of the second target pixels LPX5 are pixels "C" each of which is adjacent to pixel "F".

If the second pixels are multi-bit data, like the second target pixels LPX4 of FIG. 29 and the second target pixels LPX5 of FIG. 30, the conversion is performed such that the second pixel indicates a value of density that is set in advance.

Figure 31:
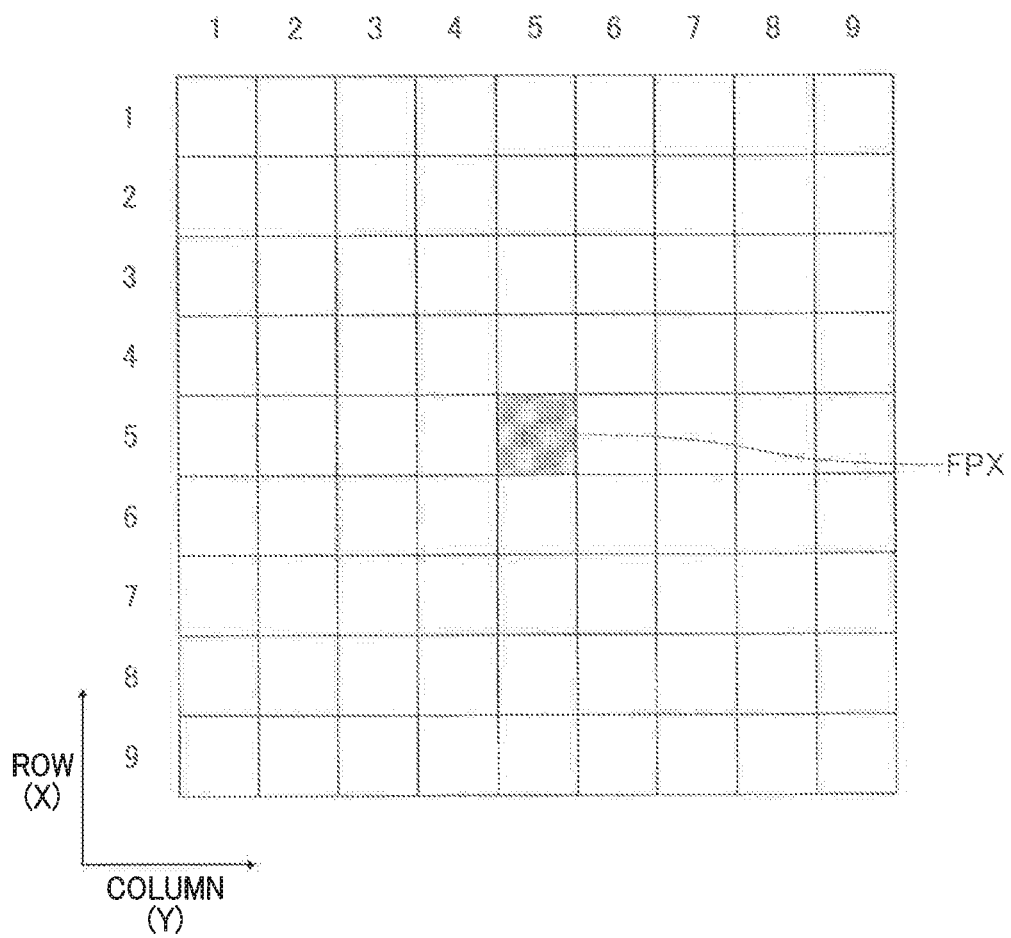
FIG. 31 is a diagram illustrating an example of pattern matching performed by the image forming apparatus of FIG. 1.

Referring now to FIG. 31, a description is given of an example of pattern matching performed in conversion.

FIG. 31 is a diagram illustrating the example of pattern matching performed by the image forming apparatus 2000. For example, the image forming apparatus 2000 performs pattern matching by use of a 9×9 image matrix as illustrated in FIG. 31, focusing a pixel (hereinafter referred to as a focused pixel FPX) that is determined as a first target pixel or not.

It is to be noted that the image matrix size is not limited to 9×9. Alternatively, for example, the image matrix may be larger than 9×9, such as 11×11. By use of a larger image matrix, the image forming apparatus 2000 can identify the first target pixel in increased variations. Further, by use of a larger image matrix, the image forming apparatus 2000 can enhance detection accuracy for identifying the first target pixel. By contrast, the image matrix may be smaller than 9×9, such as 7×7. By use of a smaller image matrix, the image forming apparatus 2000 can downsize a circuit size relative to the image matrix.

Specifically in the pattern matching, for example, the image forming apparatus 2000 determines whether the location of the focused pixel FPX and its neighborhood is identical to the location of the specific data of, e.g., FIGS. 11A through 11D. The following will describe an example of pattern matching with the specific data of FIG. 11A. In the present example, first, the image forming apparatus 2000 determines whether the focused pixel FPX is "0" or not. If the focused pixel FPX is not "0", the image forming apparatus 2000 determines that the focused pixel FPX is not a pixel of the specific data of FIG. 11A. According to the specific data of FIG. 11A, the image forming apparatus 2000 determines whether a pixel located immediately on the left side of the focused pixel FPX is "0" and whether four pixels located immediately on the right side of the focused pixel FPX are all "1". If the pixel located immediately on the left side of the focused pixel FPX is "0" and if the four pixels located immediately on the right side of the focused pixel FPX are all "1", then, the image forming apparatus 2000 determines that the focused pixel FPX is a pixel of the specific data of FIG. 11A. Then, according to the tag data, the image forming apparatus 2000 determines whether the focused pixel FPX has an attribute of "text".

If the focused pixel FPX is a pixel of the specific data of FIG. 11A and if the focused pixel FPX has an attribute of "text", then, the image forming apparatus 2000 determines that the focused pixel FPX is a first target pixel subjected to the conversion illustrated in, e.g., FIG. 17.

It is to be noted that precedence may be established in the pattern matching. Specifically, a plurality of patterns to be detected by the pattern matching are organized in order of priority in advance. The image forming apparatus 2000 detects the plurality of patterns in order of precedence by the pattern matching. If the image forming apparatus 2000 detects a pattern corresponding to the plurality of patterns, the image forming apparatus may determine that the pattern corresponds to a prior pattern.

If the pattern matching is performed with, e.g., an electronic circuit, pattern matching of the plurality of patterns may not be executed at once. Hence, with the precedence established as described above, the image forming apparatus 2000 may execute the pattern matching of the plurality of patterns with, e.g., the electronic circuit.

In the pattern matching, the image forming apparatus 2000 may determine whether the focused pixel FPX is to be thickened, according to the color of the focused pixel FPX. For example, the image forming apparatus 2000 may be set in advance so as to identify a pixel of black (K) out of the colors (e.g., black (K), cyan (C), magenta (M), and yellow (Y)) of an image that the image forming apparatus 2000 forms. However, a black text or line may be easily blurred. To address this circumstance, a pixel of black text or line may be identified by the pattern matching.

Referring back to FIG. 10, a description is given of step S06, which is forming an image according to the second image data.

In step S06, the image forming apparatus 2000 forms an image according to the second image data. That is, the image forming apparatus 2000 forms an image on a recording medium according to the image data generated by conversion.

Figures 32A, 32B:
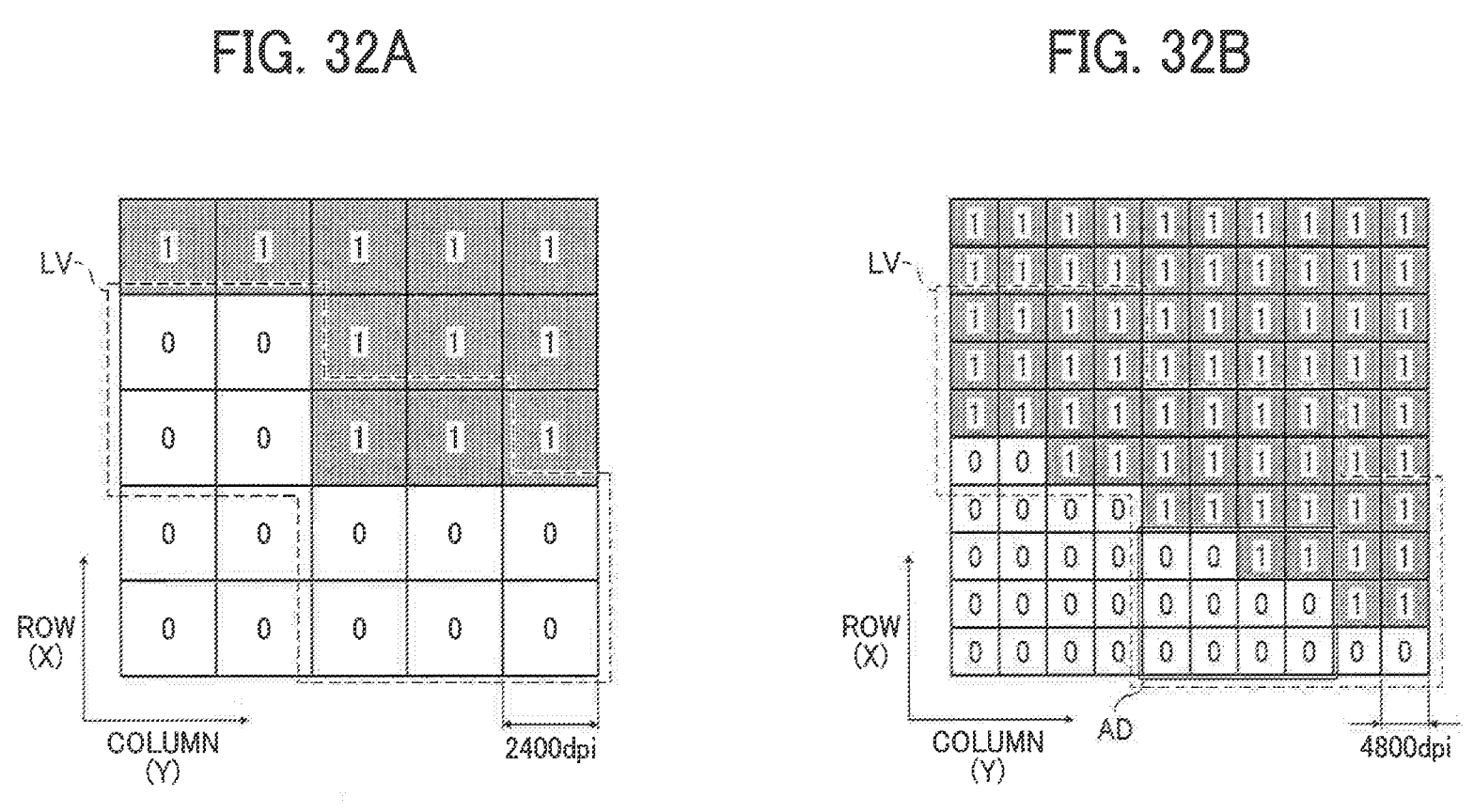

Referring now to FIGS. 32A and 32B, a description is given of an example of a smoothing processing performed by the image forming apparatus 2000.

The image forming apparatus 2000 may perform a smoothing processing to smooth an image corner that is an edge in both the row and column directions and therefore defining a difference between the image and the background. In other words, the smoothing processing is performed to eliminate the difference between the image and the background to smooth an outline of the image.

FIG. 32A is a diagram illustrating image data before the smoothing processing is performed by the image forming apparatus 2000. FIG. 32B is a diagram illustrating image data after the smoothing processing is performed by the image forming apparatus 2000. FIG. 32A illustrates a difference LV subjected to the smoothing processing. Similar to, e.g., FIG. 17, image data having a resolution of 2400 dpi of FIG. 32A is converted into image data having a resolution of 4800 dpi of FIG. 32B. In addition, similar to, e.g., FIG. 17, the light source 2200 is turned off if the pixel is "0". On the other hand, the light source 2200 is turned on if the pixel is "1".

By the smoothing processing, the image data is changed from the state illustrated in FIG. 32A to a state illustrated in FIG. 32B. Specifically, first, the image forming apparatus 2000 detects pixels as the difference LV by, e.g., pattern matching.

After detecting the difference LV, the image forming apparatus 2000 performs the smoothing processing. By the smoothing processing, a part of pixels indicating "0" included in the difference LV of FIG. 32A are changed to pixels indicating "1" as illustrated in FIG. 32B. That is, by the smoothing processing, a part of pixels to turn off the light source 2200 included in the difference LV are converted into pixels to turn on the light source 2200. By the smoothing processing, the difference LV illustrated in FIG. 32B includes a smoothed corner compared to the difference LV illustrated in FIG. 32A.

It is to be noted that the smoothing processing is not limited to the example illustrated in FIGS. 32A and 32B. For example, some pixels AD indicating "0" of FIG. 32B may be pixels "1" by the smoothing processing.

Figure 33:
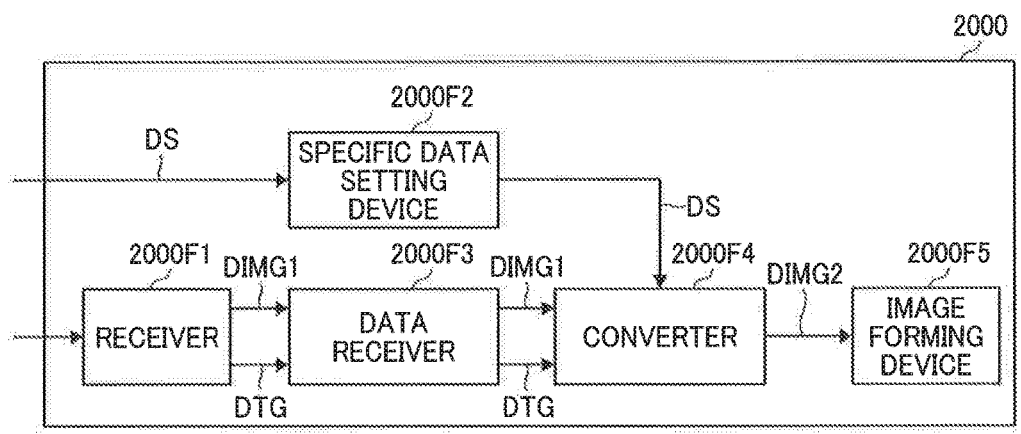
FIG. 33 is a block diagram illustrating a functional structure of the image forming apparatus of FIG. 1.

Referring now to FIG. 33, a description is given of a functional structure of the image forming apparatus 2000.

FIG. 33 is a block diagram illustrating an example of the functional structure of the image forming apparatus 2000. The image forming apparatus 2000 includes, e.g., a receiver 2000F1, a specific data setting device 2000F2, a data receiver 2000F3, a converter 2000F4, and image forming device 2000F5.

The receiver 2000F1 receives data that indicates a printing instruction and image data from the upstream device 100 illustrated in FIG. 1. The receiver 2000F1 is implemented by, e.g., the controller 2001, the first plotter controller 2002, and the CPU 2005, all illustrated in FIG. 9.

The data receiver 2000F3 receives first image data DIMG1 and tag data DTG. The first image data DIMG1 includes multiple first pixels each of which indicates density of an image to be formed or one of turning on the light source 2200 and turning off the light source 2200. The tag data DTG indicates an attribute of each of the first pixels. The data receiver 2000F3 is implemented by, e.g., the second plotter controller 2003 and the third plotter controller 2006, both illustrated in FIG. 9.

The specific data setting device 2000F2 sets specific data DS to identify a first target pixel subjected to change, out of the multiple first pixels. The specific data setting device 2000F2 is implemented by, e.g., the CPU 2005 illustrated in FIG. 9.

The converter 2000F4 converts the first image data DIMG1 into second image data DIMG2 having a higher resolution than a resolution of the first image data DIMG1. Specifically, according to the specific data DS and the tag data DTG, the converter 2000F4 identifies a second target pixel corresponding to the first target pixel out of second pixels included in the second image data DIMG2. The converter 2000F4 generates the second image data DIMG2 such that the second target pixel indicates turning on the light source 2200 or higher density than density of the first target pixel. The converter 2000F4 is implemented by, e.g., the second plotter controller 2003 and the third plotter controller 2006, both illustrated in FIG. 9.

The image forming device 2000F5 controls the light source 2200 according to the second image data DIMG2, to form an image. The image forming device 2000F5 is implemented by, e.g., the second plotter controller 2003 and the third plotter controller 2006, both illustrated in FIG. 9.

First, the image forming apparatus 2000 receives, e.g., the printing instruction and the image data with the receiver 2000F1. The specific data setting device 2000F2 sets in advance the specific data DS in the image forming apparatus 2000.

When the receiver 2000F1 receives the image data that indicates an image subjected to printing, the image forming apparatus 2000 performs image processing to generate the first image data DIMG1. Meanwhile, the image forming apparatus 2000 generates the tag data DTG that indicates an attribute of each of the first pixels included in the first image data DIMG1.

The data receiver 2000F3 receives the first image data DIMG1 and the tag data DTG thus generated, as illustrated in FIG. 16, for example. Then, the image forming apparatus 2000 performs, e.g., double-density processing with the converter 2000F4 to convert the first image data DIMG1 to the second image data DIMG2 having a higher resolution than the resolution of the first image data DIMG1. In the conversion, according to the specific data DS and the tag data DTG, the image forming apparatus 2000 determines whether the second image data DIMG2 includes a second pixel as the second target pixel corresponding the first target pixel. Specifically, first, according to the tag data DTG, the image forming apparatus 2000 determines whether the first target pixel has an attribute of text or line. Further, according to the specific data DS, the image forming apparatus 2000 performs pattern matching as illustrated in FIG. 31, for example, to determine whether a focused pixel is the first target pixel (e.g., edge portion).

Thus, if the image forming apparatus 2000 determines that the focused pixel is the first target pixel having an attribute of text or line according to the specific data DS and the tag data DTG, the image forming apparatus 2000 executes a process to thicken, e.g., the text as illustrated in FIG. 17. Accordingly, the image forming apparatus 2000 can form a thickened text or line as an image.

Generally, formation of high quality images is desired particularly in production printing. However, during formation of small images, such as a text equal to or smaller than five points high, the text or line may be blurred.

Hence, according to the embodiments described above, the image forming apparatus 2000 thickens the text or line. Specifically, when converting image data, the image forming apparatus 2000 changes a part of pixels included in the image data to thicken the text or line, thus forming an image. More specifically, as illustrated in, e.g., FIG. 12, the image forming apparatus 2000 identifies the first target pixel as a boundary (e.g., edge portion). The image forming apparatus 2000 changes the second target pixel corresponding to the first target pixel to thicken the text or line. As illustrated in, e.g., FIGS. 17 and 28, the conversion includes adding one or more pixels that turn on the light source 2200.

Thus, the image forming apparatus 2000 suppresses formation of blurred images such as blurred lines and texts. Accordingly, the image forming apparatus 2000 enhances image quality.

The image forming apparatus 2000 may employ alternating current (AC) development in which an AC bias is applied. That is, in the AC development, developing voltage including an AC component is applied to a developing sleeve in a developing device. On the other hand, in a direct current (DC) development, DC component voltage is applied as the developing voltage. In the developing device, a potential difference between a surface potential of the developing sleeve supplied with the developing voltage and a surface potential of a latent image bearer moves toner from the developing sleeve to the latent image bearer. Thus, the toner adheres to a latent image.

Image formation by the AC development prevents unevenness in density, for example.

Figure 34:
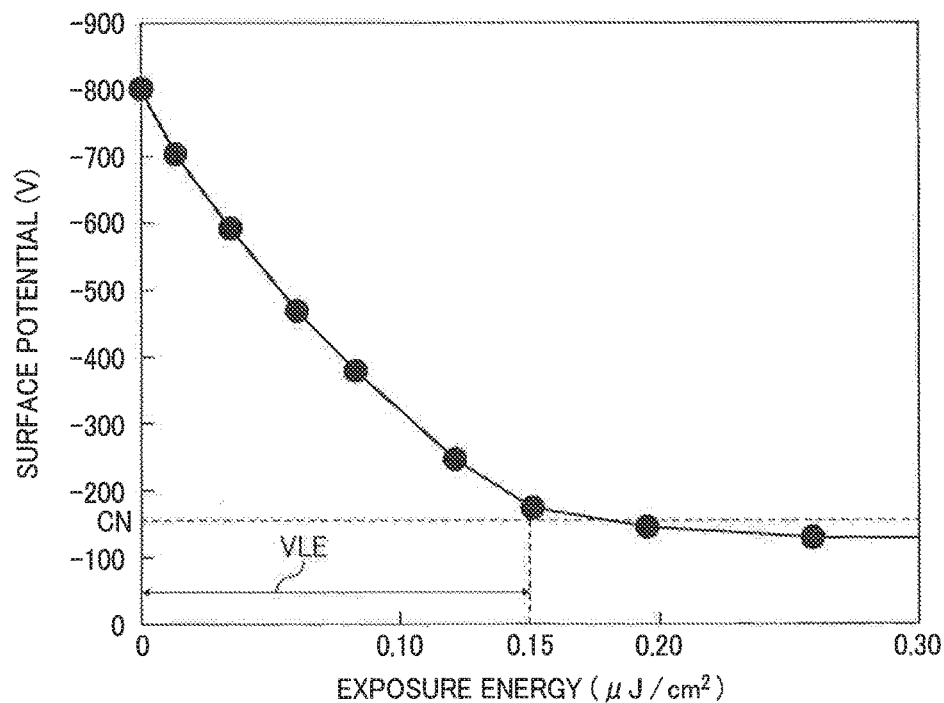
FIG. 34 is a graph illustrating an example of exposure energy used for a high voltage control performed by the image forming apparatus of FIG. 1.

FIG. 34 is a graph illustrating an example of exposure energy used for a high voltage control performed by the image forming apparatus 2000. In other words, FIG. 34 is a graph illustrating a photo-induced discharge curve (PIDC). In FIG. 34, the horizontal axis indicates exposure energy. The vertical axis indicates surface potential of the photoconductive drum 2030.

In the present example, the surface potential of the photoconductive drum 2030 converges at a potential (hereinafter referred to as a convergence potential CN) of about −190 V when the exposure energy is equal to greater than about 0.15 μJ/cm2. That is, if the exposure energy exceeds a predetermined value (i.e., 0.15 μJ/cm2 in the present example), an absolute surface potential of the photoconductive drum 2030 is less likely to decrease from the convergence potential CN while the exposure energy increases. It is to be noted that the predetermined value may be referred to as residual potential. The residual potential is a value determined according to, e.g., a material of a photoconductor. Fatigue of the photoconductor depending on working conditions increases an absolute residual potential.

By contrast, as illustrated in FIG. 34, if the exposure energy is equal to or less than the predetermined value, that is, equal to or less than 0.15 μJ/cm2 in the present example, the absolute surface potential of the photoconductive drum 2030 is equal to or greater than the convergence potential CN. The image forming apparatus 2000 may perform control by use of exposure energy VLE equal to or less than the predetermined value (i.e., 0.15 μJ/cm2 in the present example). The control is hereinafter referred to as high voltage control. The term "high voltage" here refers to the potential of the photoconductive drum 2030 when exposed. For example, the high voltage control is performed at a surface potential of about −400 V in the present example of FIG. 34. Since the exposure energy VLE used in the high voltage control is relatively weak, the toner may have difficulty in adhering to the photoconductor. As a consequence, an insufficient amount of toner may adhere to the photoconductor, blurring an image such as a text.

Hence, the image forming apparatus 2000 may perform thickening processing to thicken an image such as a line and a text when the image forming device 2000F5 performs the high voltage control by use of the exposure energy VLE equal to or less than the predetermined value to form the image.

According to the embodiments described above, the image forming apparatus 2000 uses tag data to determine whether a pixel is data that indicates a text or line. If a pixel indicating, e.g., a picture (i.e., pixel indicating other than the text or line) is converted as illustrated in, e.g., FIG. 17, a tint may change. Hence, preferably, the image forming apparatus 2000 uses the tag data to select a pixel that indicates a text or line and convert the pixel as illustrated in, e.g., FIG. 17. Accordingly, the image forming apparatus 2000 enhances image quality of an image, such as a picture, other than a text or line. Preferably, the tag data is 1 bit data that indicates whether the pixel is a text or line. By using 1-bit tag data, the image forming apparatus 2000 reduces capacity of the tag data compared to multi-bit tag data.

Preferably, the image forming apparatus 2000 performs image data conversion at a later stage where the light sources 2200 is controlled, for example. Specifically, for example, the second plotter controller 2003 and the third plotter controller 2006 of FIG. 9 performs the image data conversion. The image data conversion accompanies double-density processing. Therefore, after the image data conversion, a larger amount of data may be transferred compared to the amount of data before the image data conversion. Hence, preferably, the image data conversion is performed at the latter stage, by the second plotter controller 2003 and the third plotter controller 2006 as illustrated in FIG. 9, for example. Thus, before conversion, the image forming apparatus 2000 reduces the amount of data to be transmitted. Meanwhile, the thickening processing is performed with a high resolution to thicken a text or line. In the high-resolution thickening processing, an amount of the text or line to be thickened can be designated in detail. For example, in the thickening processing with a resolution of 4800 dpi, the amount of the text or line to be thickened is designated in units of 5 microns. It is to be noted that, preferably, the resolution of the second image data is two or more times higher than the resolution of the first image data. Accordingly, the image forming apparatus 2000 enhances formation of a highly defined image.

According to the embodiments described above, the image forming apparatus 2000 reduces formation of blurred lines or texts, thereby enhancing image quality.

Although the present disclosure makes reference to specific embodiments, it is to be noted that the present disclosure is not limited to the details of the embodiments described above and various modifications and enhancements are possible without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Any one of the above-described operations may be performed in various other ways, for example, in an order different from that described above.

Further, any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored in any kind of storage medium. Examples of storage mediums include, but are not limited to, flexible disk, hard disk, optical discs, magneto-optical discs, magnetic tapes, non-volatile memory cards, read only memory (ROM), etc.

Alternatively, any one of the above-described and other methods of the present disclosure may be implemented by an ASIC, prepared by interconnecting an appropriate network of conventional component circuits or by a combination thereof with one or more conventional general purpose microprocessors and/or signal processors programmed accordingly.

What is claimed is:

1. An image forming apparatus comprising:
   at least one photoconductor;
   a light source to expose the at least one photoconductor; and
   circuitry to:
   receive first image data and tag data, the first image data including first pixels each indicating density of an image to be formed, the tag data indicating an attribute of each of the first pixels;
   set specific data to identify a first target pixel subjected to change out of the first pixels;
   convert the first image data into second image data including second pixels, the second image data having a higher resolution than a resolution of the first image data; and
   control the light source according to the second image data to form the image,
   in conversion of the first image data into the second image data, the circuitry identifying a second target pixel corresponding to the first target pixel out of the second pixels of the second image data according to the specific data and the tag data, and changing the second target pixel into a pixel to turn on the light source, so as to generate the second image data.

2. The image forming apparatus according to claim 1, wherein the circuitry performs a high voltage control by use of exposure energy equal to or less than a predetermined value.

3. The image forming apparatus according to claim 2, wherein a surface potential of the at least one photoconductor converges when the exposure energy exceeds the predetermined value.

4. The image forming apparatus according to claim 1, wherein the resolution of the second image data is two or more times higher than the resolution of the first image data.

5. The image forming apparatus according to claim 1, wherein the circuitry identifies the first target pixel by pattern matching.

6. The image forming apparatus according to claim 5, wherein the specific data indicates a plurality of patterns in the pattern matching, and
   wherein the plurality of patterns is organized in order of priority.

7. The image forming apparatus according to claim 1, wherein the first target pixel is adjacent to an edge of one of a text and a line of the image.

8. The image forming apparatus according to claim 1, wherein the tag data is 1 bit data indicating whether each of the first pixels is one of a text and a line of the image.

9. The image forming apparatus according to claim 1, wherein the circuitry adds one or more pixels to turn on the light source, so as to thicken one of a text and a line of the image.

10. The image forming apparatus according to claim 9, wherein the circuitry adds the one or more pixels to turn on the light source in the resolution of the second image data.

11. The image forming apparatus according to claim 1, wherein the first pixels and the second pixels are 1 bit data indicating the one of turning on the light source and turning off the light source.

12. The image forming apparatus according to claim 1, wherein the first pixels and the second pixels are multi-bit data indicating the density.

13. The image forming apparatus according to claim 1, wherein, if the first image data includes a pixel defining a difference, the circuitry performs a smoothing processing to eliminate the difference, and
   wherein the circuitry changes the pixel defining the difference into the pixel to turn on the light source, so as to generate the second image data.

14. An image forming apparatus comprising:
   at least one photoconductor;
   a light source to expose the at least one photoconductor;
   means for receiving first image data and tag data, the first image data including first pixels each indicating density of an image to be formed, the tag data indicating an attribute of each of the first pixels;
   means for setting specific data to identify a first target pixel subjected to change out of the first pixels;
   means for converting the first image data into second image data including second pixels, the second image data having a higher resolution than a resolution of the first image data,
   the means for converting identifying a second target pixel corresponding to the first target pixel out of the second pixels of the second image data according to the specific data and the tag data,
   the means for converting changing the second target pixel into a pixel to turn on the light source, so as to generate the second image data; and
   means for controlling the light source according to the second image data to form the image.

15. The image forming apparatus according to claim 14, wherein the means for controlling performs a high voltage control by use of exposure energy equal to or less than a predetermined value.

16. The image forming apparatus according to claim 14, wherein the means for converting identifies the first target pixel by pattern matching.

17. The image forming apparatus according to claim 14, wherein the means for converting adds one or more pixels to turn on the light source, so as to thicken one of a text and a line of the image.

18. The image forming apparatus according to claim 17, wherein the means for converting adds the one or more pixels to turn on the light source in the resolution of the second image data.

19. The image forming apparatus according to claim 14, wherein, if the first image data includes a pixel defining a difference, the means for converting performs a smoothing processing to eliminate the difference, and
   wherein the means for converting changes the pixel defining the difference into the pixel to turn on the light source, so as to generate the second image data.

20. A method for forming an image by an image forming apparatus, the image forming apparatus including at least one photoconductor and a light source, the method comprising:

receiving first image data and tag data, the first image data including first pixels each indicating density of an image to be formed, the tag data indicating an attribute of each of the first pixels;

setting specific data to identify a first target pixel subjected to change out of the first pixels;

converting the first image data into second image data including second pixels, the second image data having a higher resolution than a resolution of the first image data, the converting including:

identifying a second target pixel corresponding to the first target pixel out of the second pixels of the second image data according to the specific data and the tag data; and changing the second target pixel into a pixel to turn on the light source so as to generate the second image data; and controlling the light source according to the second image data to form the image.

\* \* \* \* \*